(12) United States Patent
Clark et al.

(10) Patent No.: US 8,573,576 B2
(45) Date of Patent: Nov. 5, 2013

(54) CLAMP FOR SINGLE-HANDED OPERATION

(75) Inventors: Jeremy Trent Clark, Toney, AL (US); Vergenia Chantel Shelton, Huntsville, AL (US)

(73) Assignee: Intuitive Research and Technology Corporation, Huntsville, AL (US)

( * ) Notice: Subject to any disclaimer, the term of this patent is extended or adjusted under 35 U.S.C. 154(b) by 938 days.

(21) Appl. No.: 12/492,296

(22) Filed: Jun. 26, 2009

(65) Prior Publication Data

US 2010/0327507 A1 Dec. 30, 2010

(51) Int. Cl.
*B25B 1/06* (2006.01)

(52) U.S. Cl.
USPC .............................. 269/217; 269/90; 269/157

(58) Field of Classification Search
USPC ..................... 269/90, 216, 217, 231, 254 CS, 269/254 MW, 254 R, 133, 207; 24/270, 498, 24/499, 512, 598.3, 490, 495, 505; 248/316.2, 316.1, 316.5; 211/62; 292/163, 137, 256, 44
See application file for complete search history.

(56) References Cited

U.S. PATENT DOCUMENTS

| | | | | | |
|---|---|---|---|---|---|
| 573,891 | A | * | 12/1896 | Martin | 248/113 |
| 611,401 | A | * | 9/1898 | White | 70/234 |
| 615,659 | A | * | 12/1898 | Blyer | 70/234 |
| 631,665 | A | * | 8/1899 | Potter | 211/5 |
| 661,677 | A | * | 11/1900 | Taylor | 211/22 |
| 1,459,582 | A | * | 6/1923 | Adelard | 24/564 |
| 1,569,275 | A | * | 1/1926 | Green | 269/130 |
| 1,574,023 | A | * | 2/1926 | Crompton et al. | 292/24 |
| 1,968,462 | A | * | 7/1934 | Merhell | 248/113 |
| 2,348,902 | A | * | 5/1944 | Hart | 248/113 |
| 2,379,060 | A | * | 6/1945 | Bacheldor | 248/113 |
| 2,432,137 | A | * | 12/1947 | Burke | 269/55 |
| 2,488,709 | A | * | 11/1949 | Colwell | 24/498 |
| 2,579,878 | A | * | 12/1951 | Stone | 248/313 |
| 2,605,795 | A | * | 8/1952 | Tracy | 269/133 |
| 2,818,294 | A | * | 12/1957 | Killough | 292/341.17 |

(Continued)

OTHER PUBLICATIONS

Cepolina, Francesco, "Self adaptable robotic clamp with flexible elements", First EURON—Technology Transfer Award, Amsterdam, Mar. 13, 2004.

*Primary Examiner* — Lee D Wilson
*Assistant Examiner* — Jamal Daniel
(74) *Attorney, Agent, or Firm* — Venable LLP; Robert S. Babayi

(57) ABSTRACT

A clamp has an open state for inserting an object from a front end and a closed state for holding the inserted object relative to a back end. The clamp includes a frame as well as a first arm and a second arm that is positioned within the frame. At least one of the first or second arms is pivotable relative to the other along a range of motion that traverses an open position corresponding to the open state of the clamp and a closed position corresponding to the closed state of the clamp. In one embodiment, at least one of the first and second arms are shaped to position the object between a front end and a back end when the clamp is in the closed state such that a pressure exerted by insertion of the object to the backend causes the front end to move along the range of motion to the closed position. A locking mechanism locks the clamp to the closed state when the front end reaches the closed position and unlocks the clamp to the open state by allowing the front end to move along the range of motion to reach the open position.

3 Claims, 29 Drawing Sheets

(56) References Cited

U.S. PATENT DOCUMENTS

| | | | |
|---|---|---|---|
| 2,926,387 A * | 3/1960 | Lombardo et al. | 249/204 |
| 2,943,878 A * | 7/1960 | Rigaud | 292/44 |
| 3,020,013 A * | 2/1962 | Ochin et al. | 248/493 |
| 3,212,688 A * | 10/1965 | Lane | 224/247 |
| 3,453,774 A | 7/1969 | Breneman et al. | |
| 3,512,227 A * | 5/1970 | Krawagna | 248/113 |
| 3,627,300 A * | 12/1971 | Caveney et al. | 269/131 |
| 3,918,278 A * | 11/1975 | Spear | 70/58 |
| 3,984,798 A * | 10/1976 | Bussen | 336/176 |
| 4,215,838 A * | 8/1980 | Gullota | 248/121 |
| 4,226,399 A * | 10/1980 | Henderson | 248/553 |
| 4,269,049 A * | 5/1981 | Henderson | 70/227 |
| 4,435,117 A * | 3/1984 | House | 414/620 |
| 4,607,873 A * | 8/1986 | Nusbaumer et al. | 294/202 |
| 4,695,067 A * | 9/1987 | Willey | 280/47.22 |
| 4,716,811 A * | 1/1988 | Johnson | 89/40.12 |
| 5,146,816 A * | 9/1992 | Badstieber | 81/487 |
| 5,312,081 A * | 5/1994 | Martin | 248/316.3 |
| 5,409,280 A | 4/1995 | Hill | |
| 5,446,948 A * | 9/1995 | Genero et al. | 24/327 |
| 5,570,500 A * | 11/1996 | Merkel | 24/495 |
| 5,619,777 A * | 4/1997 | Genero et al. | 24/495 |
| 5,678,284 A * | 10/1997 | Genero et al. | 24/327 |
| 5,713,112 A * | 2/1998 | Genero et al. | 24/490 |
| 5,971,455 A | 10/1999 | Wolin et al. | |
| 6,152,412 A * | 11/2000 | Basickes et al. | 248/317 |
| 6,176,457 B1 * | 1/2001 | Soderstrom | 248/316.7 |
| 6,217,094 B1 | 4/2001 | Hanaduka et al. | |
| 6,220,557 B1 * | 4/2001 | Ziaylek et al. | 248/316.1 |
| 6,298,549 B1 * | 10/2001 | Mangone, Jr. | 29/809 |
| 6,322,578 B1 | 11/2001 | Houle et al. | |
| 6,412,130 B1 | 7/2002 | Kershaw et al. | |
| 6,474,612 B2 * | 11/2002 | Ross, Jr. | 248/317 |
| 6,606,786 B2 * | 8/2003 | Mangone, Jr. | 29/809 |
| 6,663,123 B1 * | 12/2003 | Kovacs | 280/79.7 |
| 6,877,613 B2 * | 4/2005 | Bleazard | 211/19 |
| 6,886,821 B2 * | 5/2005 | Eberle, III | 269/133 |
| 6,932,312 B1 * | 8/2005 | Chen | 248/316.1 |
| 7,146,887 B2 | 12/2006 | Hunter | |
| 7,185,796 B2 | 3/2007 | Parsons | |
| 7,621,495 B2 * | 11/2009 | Young | 248/316.1 |
| 7,703,358 B2 * | 4/2010 | Felix | 81/487 |
| 7,806,394 B2 * | 10/2010 | Wuerthner | 269/133 |
| 7,849,590 B2 * | 12/2010 | Mangone, Jr. | 29/811.2 |
| 7,900,325 B1 * | 3/2011 | Mangone, Jr. | 24/543 |
| 7,966,703 B2 * | 6/2011 | Felix | 24/514 |
| 2002/0130237 A1 * | 9/2002 | Kluser | 248/316.1 |
| 2002/0158473 A1 * | 10/2002 | Ogino | 292/44 |
| 2007/0186733 A1 | 8/2007 | Seber et al. | |
| 2009/0184450 A1 * | 7/2009 | Wuerthner | 269/133 |
| 2011/0042878 A1 * | 2/2011 | Shrock | 269/90 |
| 2012/0049020 A1 * | 3/2012 | Stock | 248/206.5 |

* cited by examiner

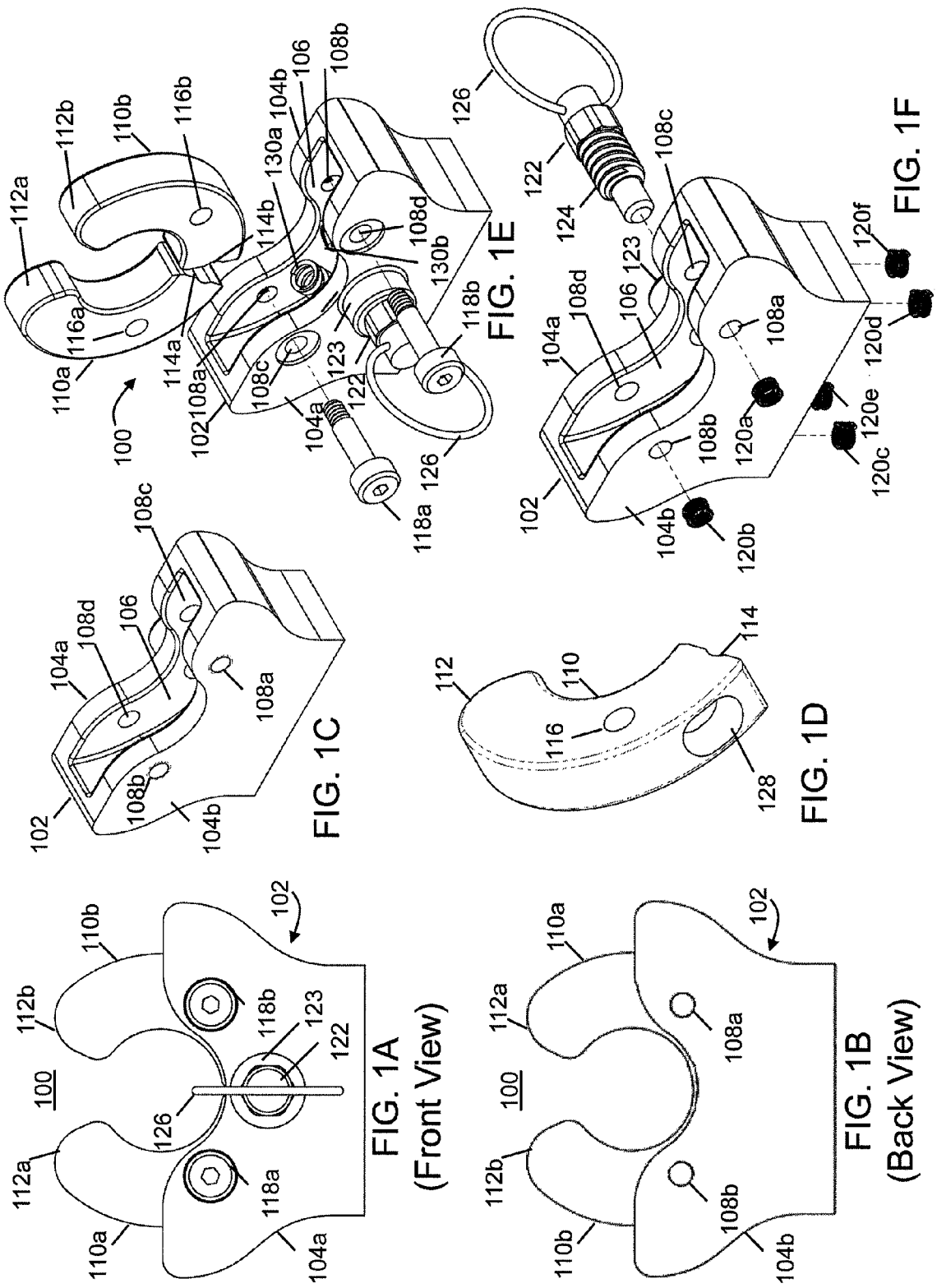

(Front View)

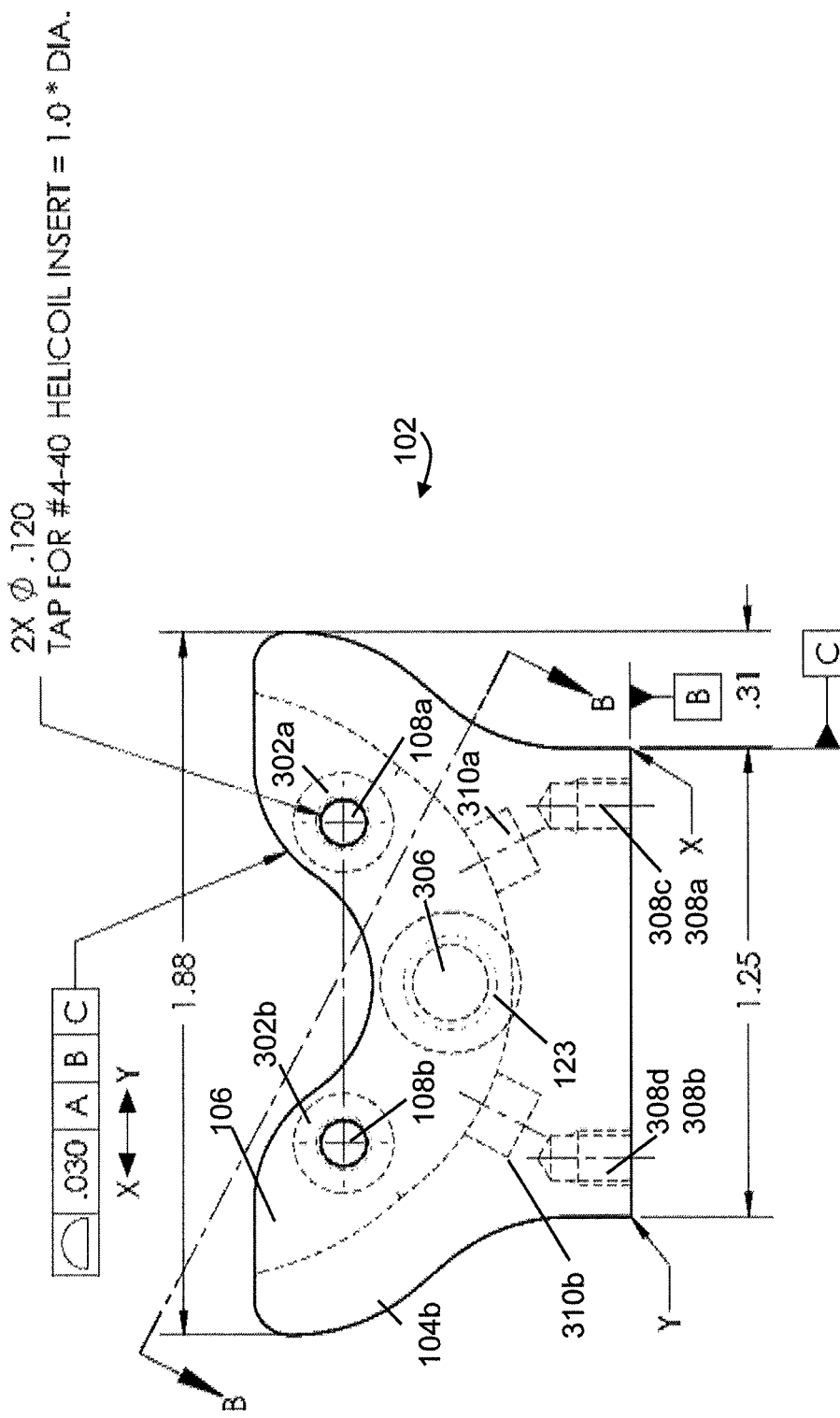
FIG. 3B (Back View)

(Cross-section A-A)

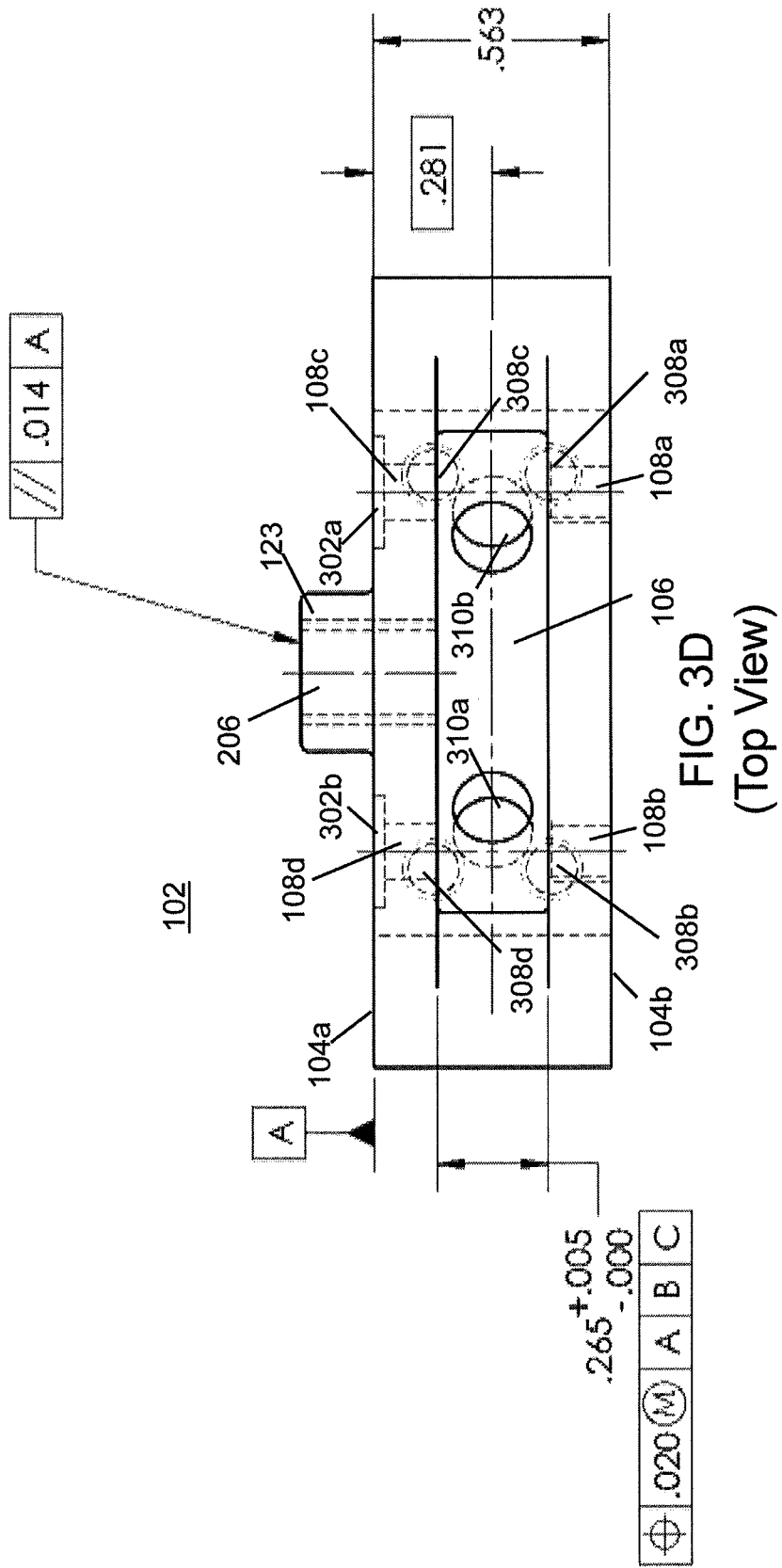

(Bottom View)

(Left Side View)

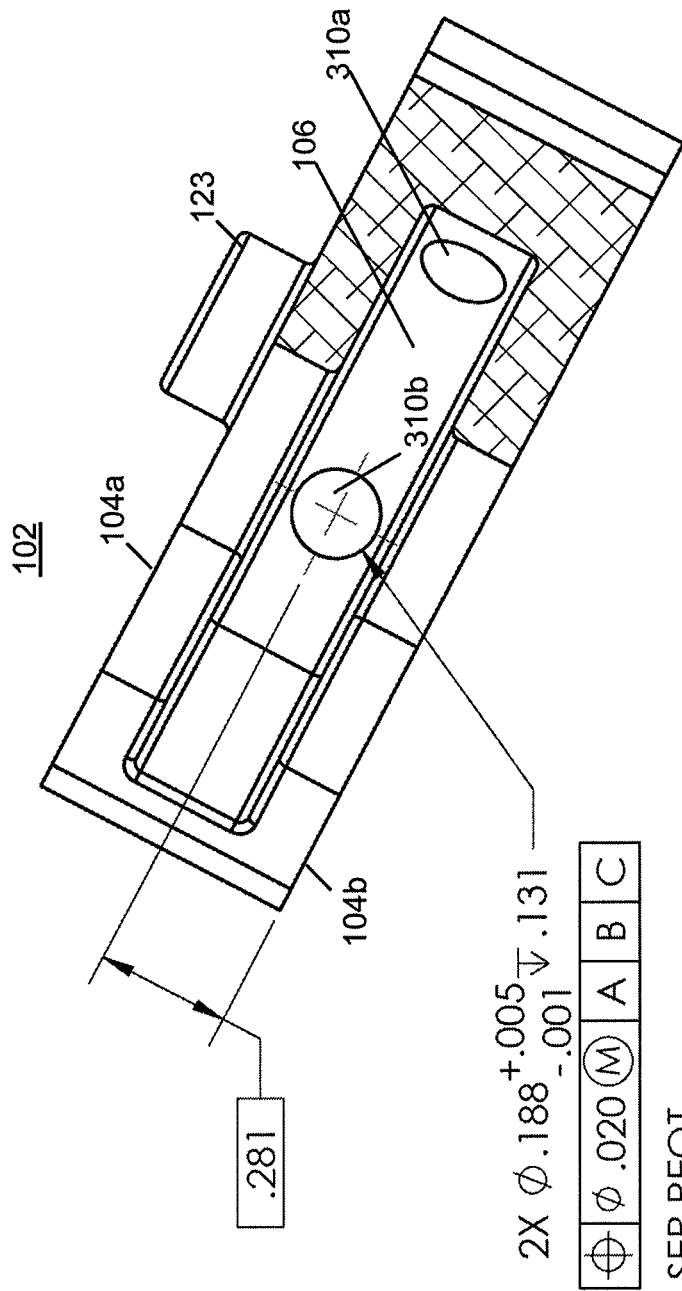
FIG. 3G (Cross-section B-B)

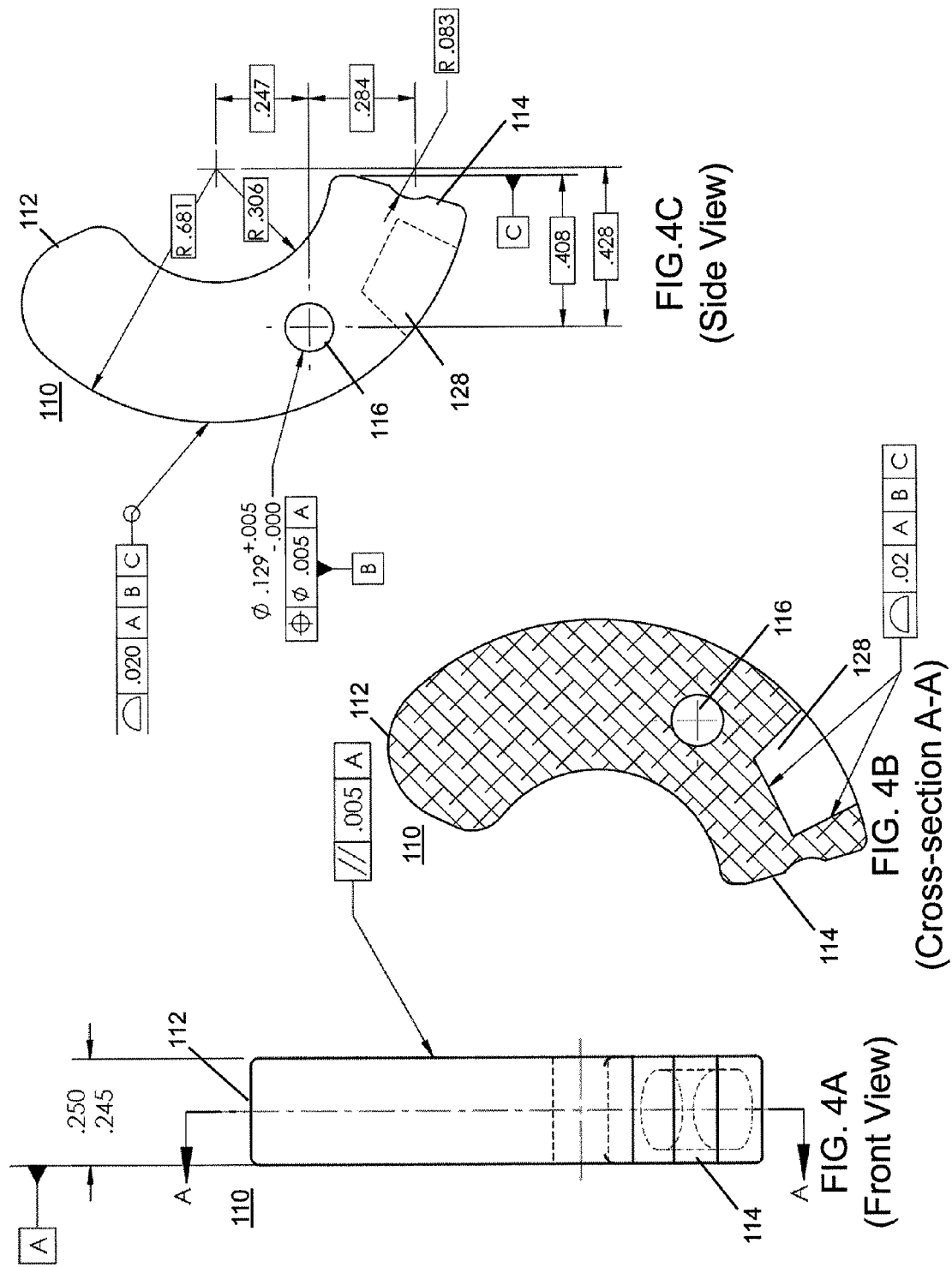

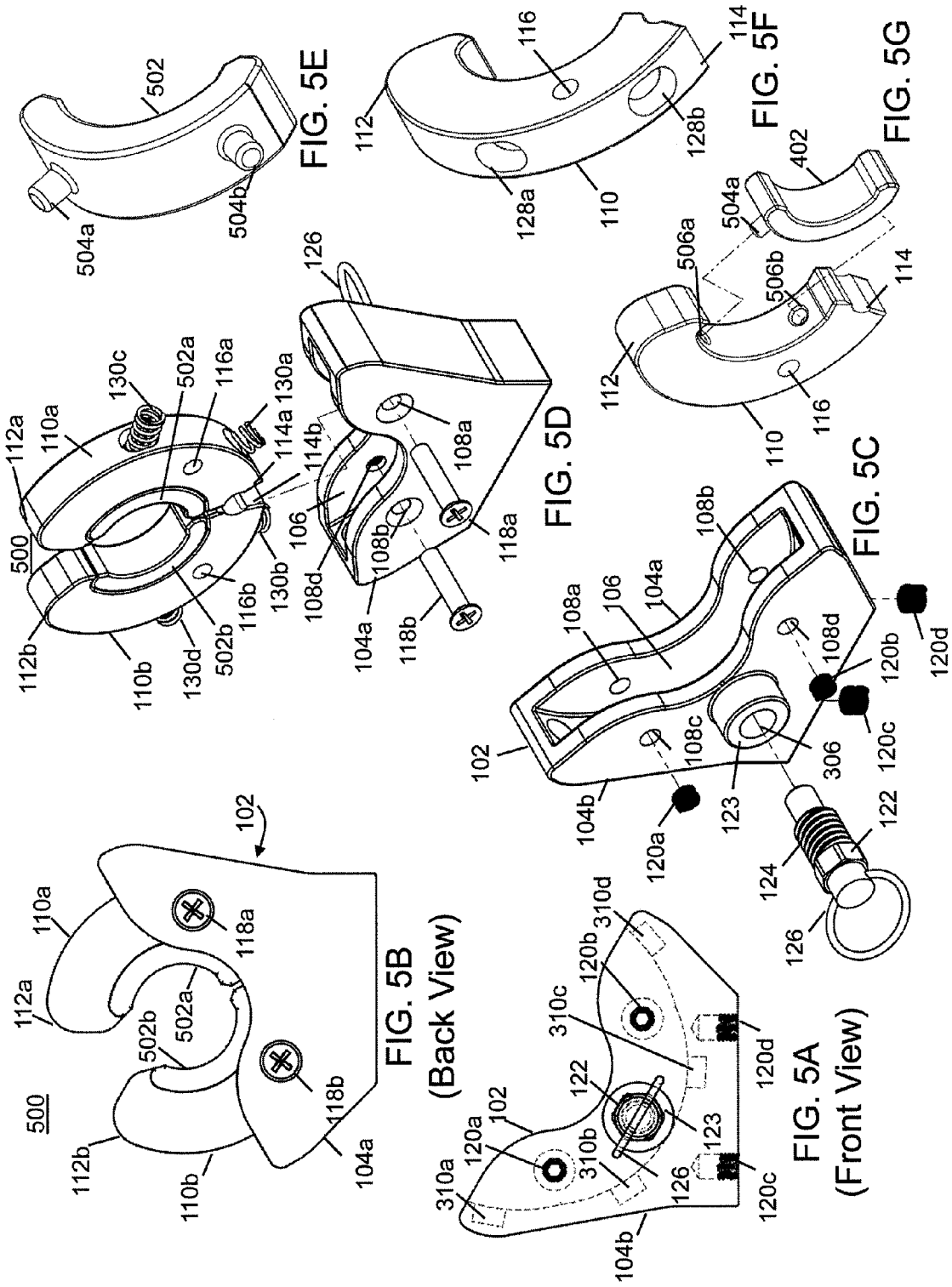

(Back View)

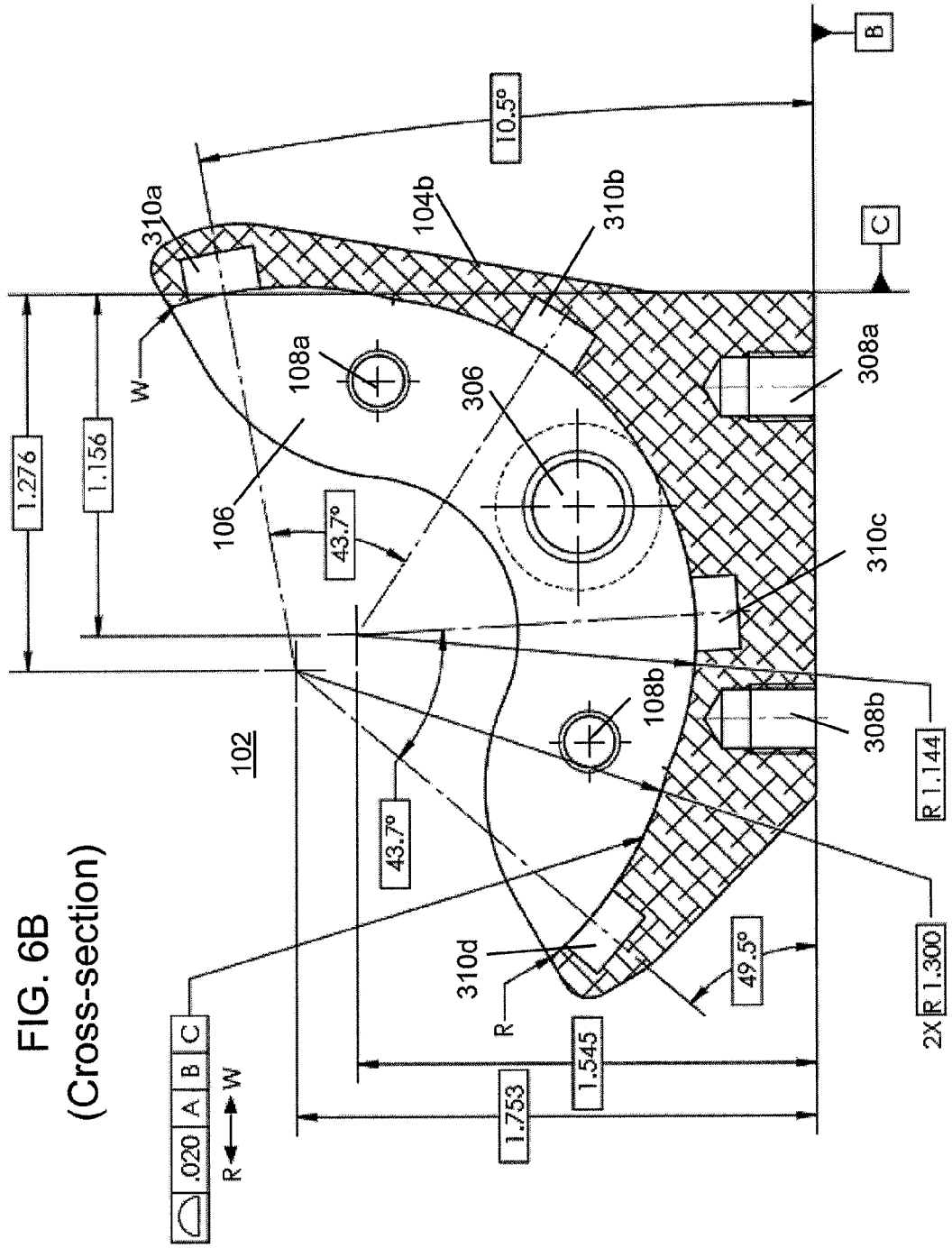

(Top View)

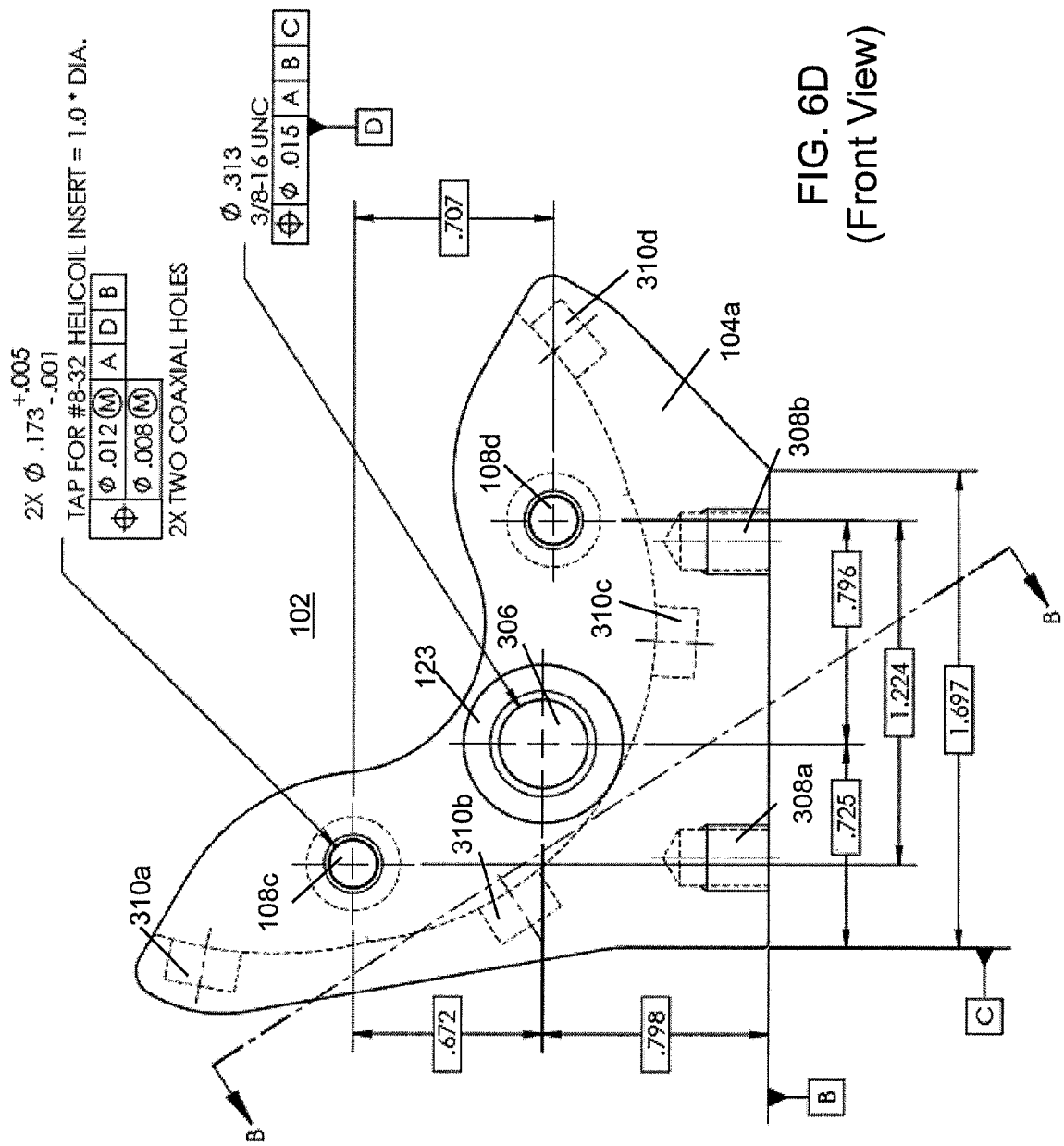
FIG. 6D (Front View)

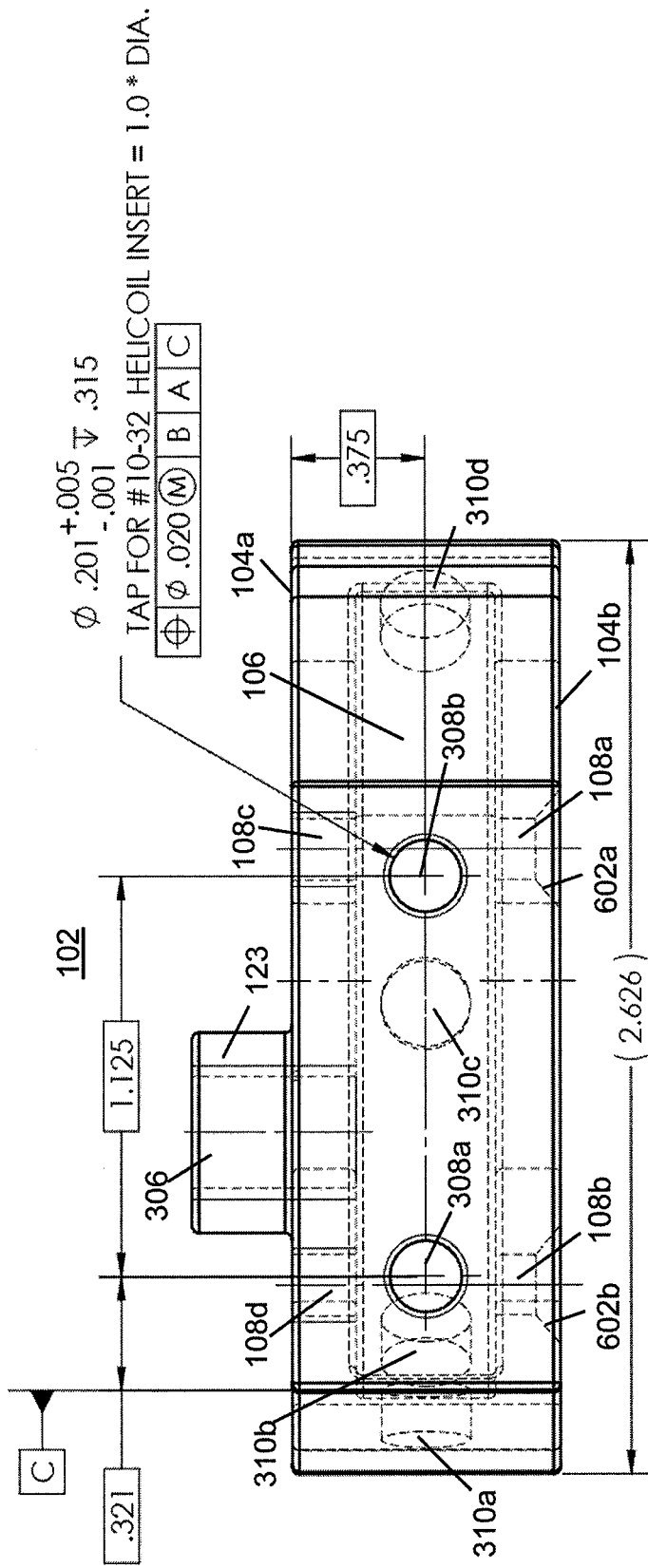
FIG. 6E (Bottom View)

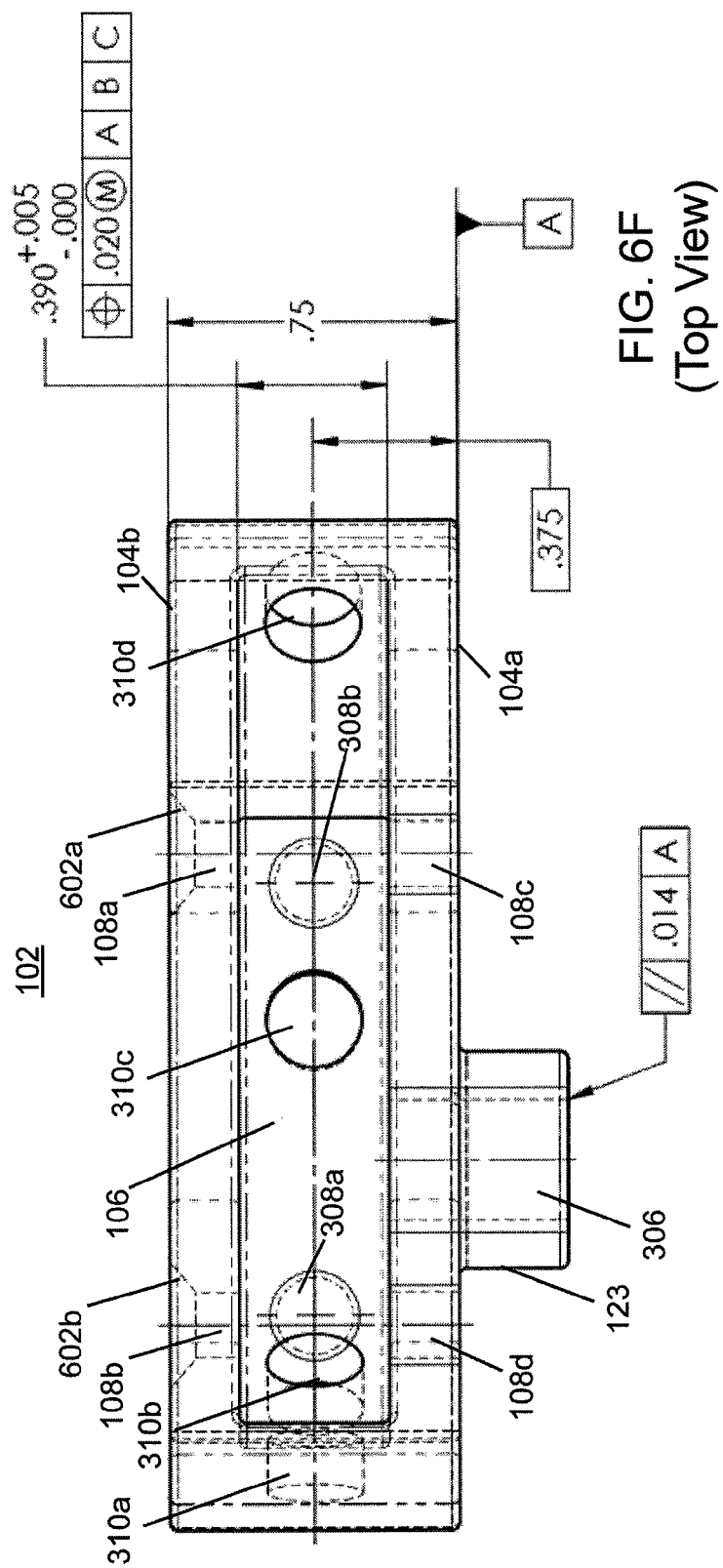
FIG. 6F (Top View)

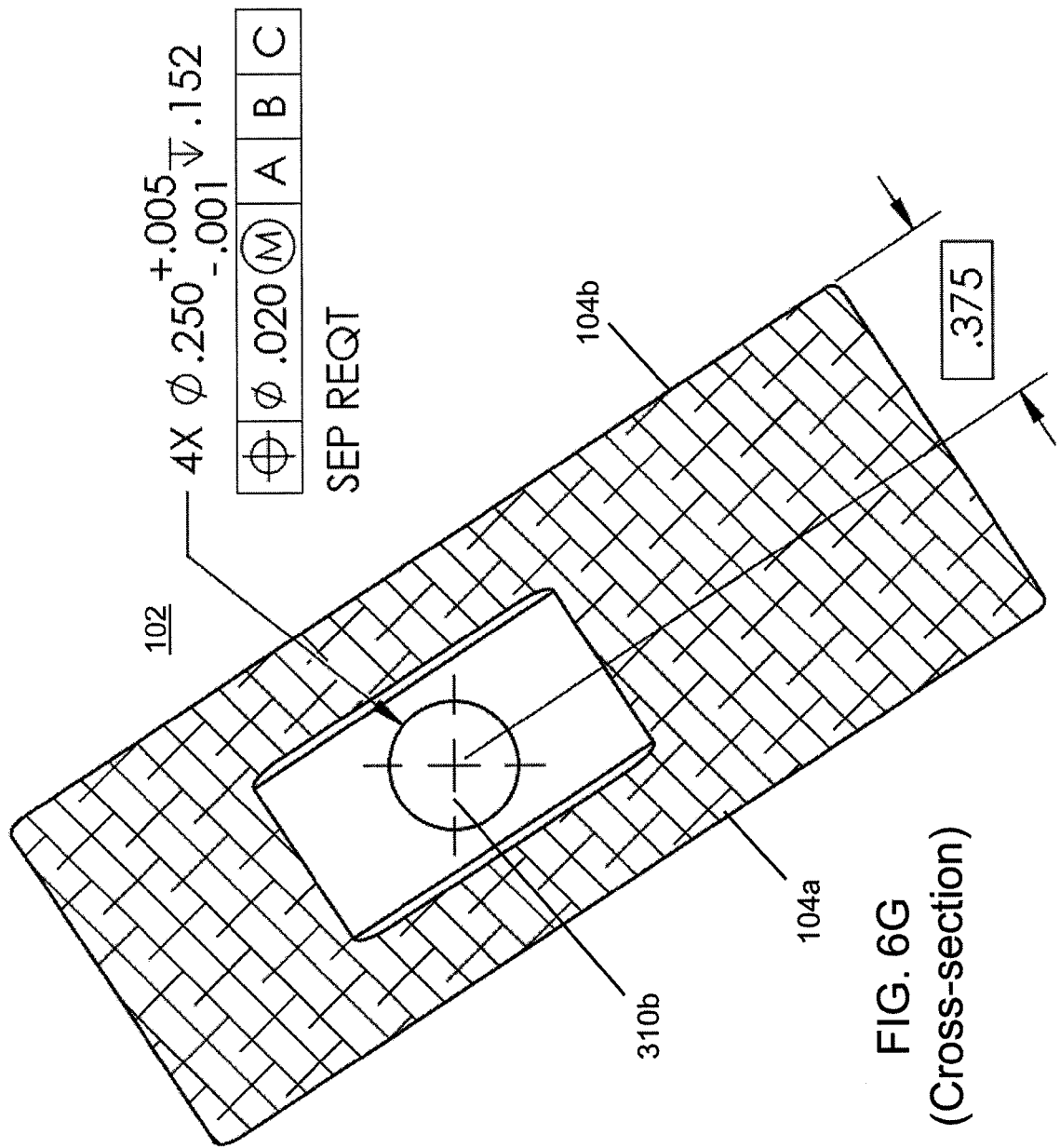
FIG. 6G (Cross-section)

(Side View)

(Top View)

(Cross-section AA)

(Cross-section B-B)

(Side View)

(Top View)

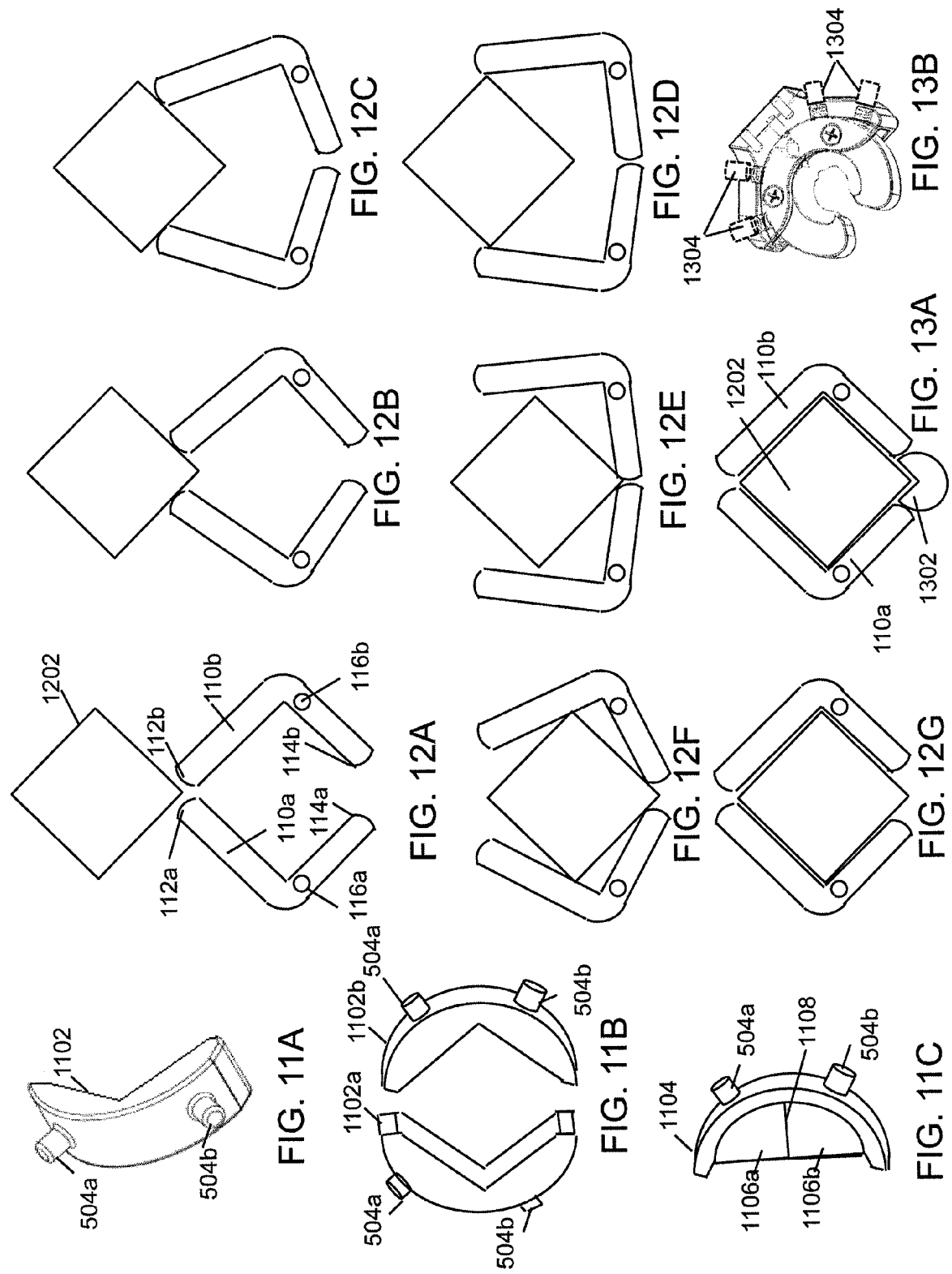

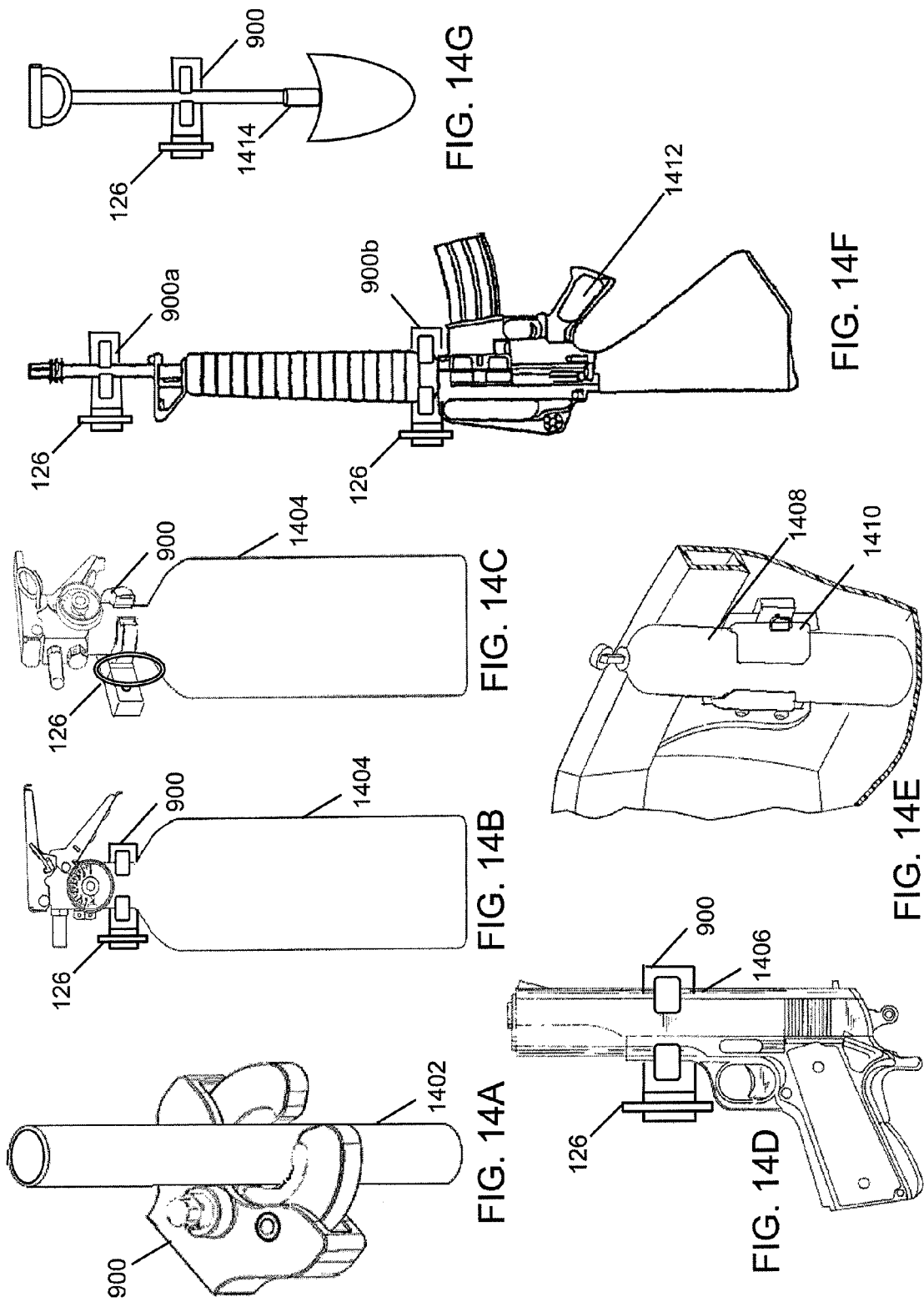

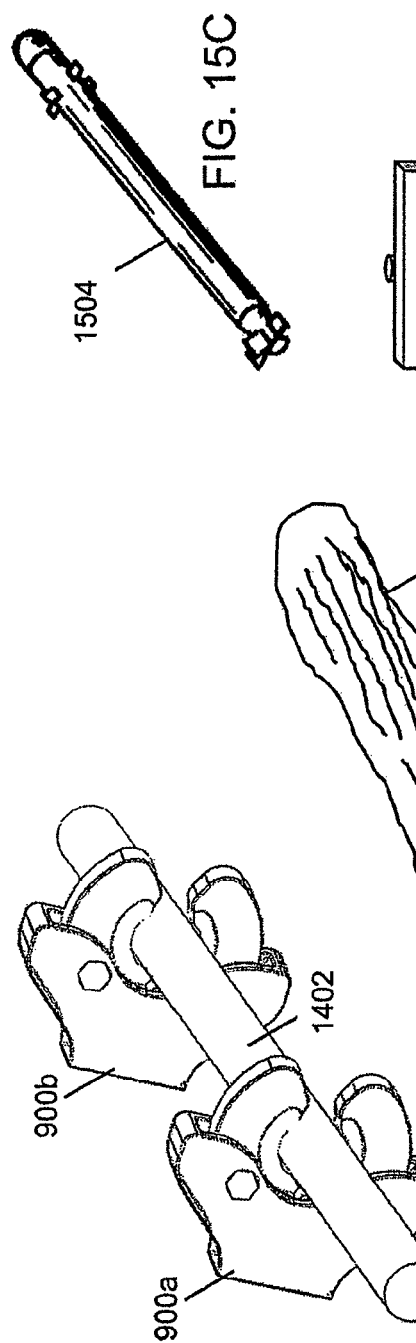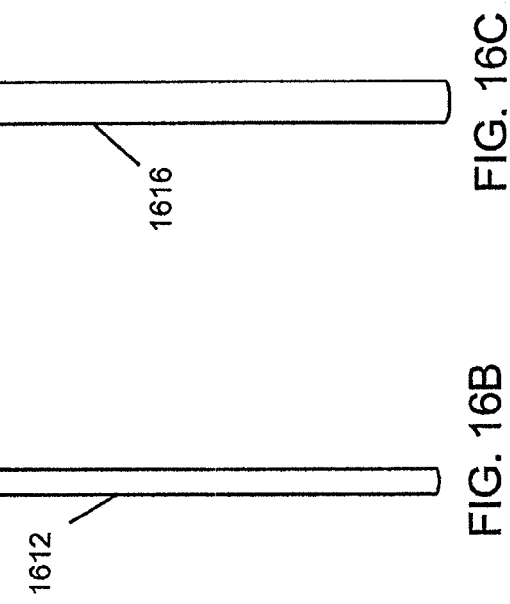

CLAMP FOR SINGLE-HANDED OPERATION

FIELD OF THE INVENTION

The present invention relates generally to a clamp for single-handed operation. More particularly, the present invention relates to single-handed operation for both closing and opening while still constraining the object after release to prevent accidental fallout.

BACKGROUND OF THE INVENTION

Most conventional clamps require a person to have both hands available to secure an object within the clamp or to open the clamp to release the object, which is not always convenient or a viable option at the time of use. More specifically, conventional clamp mechanisms typically require a person to use one hand to open or close the clamp while the other hand is needed to hold or otherwise control the object being placed into the clamp or being removed from the clamp. If only one hand is available to secure the object within the clamp, the object may fall out of the clamp after it has been placed into the clamp with one hand when that same hand must release the object in order to secure the clamp mechanism so it securely holds the object. Similarly, while the clamp is being opened by one hand that same hand is not able to hold onto the object, so that object may fall out of the clamp.

Because such conventional clamps completely release an object when opened, a person is forced to use one hand to control the object when a clamp is in an open clamp state, transitioning from an open clamp state to a closed clamp state, or transitioning from a closed clamp state to an open clamp state. But, in certain applications, two hands are not available for placing an object into or removing an object from a clamp.

Conventional clamps that do allow single-handed operation, such as various types of clamps used to hold handles of brooms, mops, and of various types of tools, typically do not have a means for locking the clamp in its closed clamp state and do not perform well in overhead applications where the weight of an object placed into such a clamp can cause it to fall out of the clamp, in particular in an application where another object to which the clamp is attached is jarred suddenly. For example, such conventional clamps for single-handed operation would not be desirable in an application where a heavy object needs to be attached to the roof of a vehicle traveling across rough terrain or secured within a spacecraft.

Therefore, there is a need for an improved clamp for single-handed operation.

SUMMARY OF THE INVENTION

Briefly, according to the present invention, a clamp has an open state for inserting an object from a front end and a closed state for holding the inserted object relative to a back end. The clamp includes a frame as well as a first arm and a second arm that are positioned within the frame. At least one of the first or second arms is pivotable relative to the other along a range of motion that traverses an open position corresponding to the open state of the clamp and a closed position corresponding to the closed state of the clamp. In one embodiment, at least one of the first and second arms are shaped to position the object between a front end and a back end when the clamp is in the closed state such that a pressure exerted by insertion of the object to the backend causes the front end to move along the range of motion to the closed position. A locking mechanism locks the clamp to the closed state when the front end reaches the closed position and unlocks the clamp to the open state by allowing the front end to move along the range of motion to reach the open position.

According to some of the more detailed features of the invention, the locking mechanism comprises a detent mechanism inserted between the back end of the first arm and the back end of the second arm when the front end reaches the closed position. In one embodiment, the detent mechanism is pull-able to allow the front end to move along the range of motion to reach the open position.

According to still other more detailed features of the invention, at least one spring that is supported by the frame inserts a force against the first or second arms for moving the front end to the closed position. An elastic mechanism such as an elastomer like rubber can be integrated into an inside portion of at least one of said first arm or second arm. The elastic mechanism can be molded to conform to the shape of an object to be held by said clamp.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 1A-1F depict a first exemplary clamp for single-handed operation and components of the first exemplary clamp in accordance with the invention;

FIGS. 3A-3G depict exemplary engineering drawings of the frame of the clamp of FIGS. 1A-1F;

FIGS. 4A-4C depict exemplary engineering drawings of the arm of the clamp of FIGS. 1A-1F;

FIGS. 5A-5G depict a second exemplary clamp for single-handed operation and components of the second exemplary clamp in accordance with the invention;

FIGS. 6A-6G depict exemplary engineering drawings of the frame of the clamp of FIGS. 5A-5G;

FIGS. 11A and 11B depict another exemplary elastic mechanism formed to hold on to a square object;

FIG. 11C depicts yet another exemplary elastic mechanism that can be activated and formed to fit around an object;

FIGS. 12A-12G depict an exemplary square shaped object being moved into two arms designed to hold onto square objects in accordance with the present invention;

FIG. 13A depict use of three quarter moon-shaped detent pin to keep the arms of FIGS. 12A-12G in their closed state;

FIG. 13B depicts use of set screws that can be used to control spring forces;

FIGS. 14A-14G depict the exemplary clamp of FIGS. 9A and 9B being used to secure various objects in accordance with the present invention;

FIG. 15A-15C depict exemplary use of multiple clamps to hold a cylindrical object and other similar objects that might be held using multiple clamps; and FIGS. 16A-16C depict exemplary scenarios where clamps in accordance with the present invention might be used to secure objects.

DETAILED DESCRIPTION OF THE INVENTION

Figure 2B:
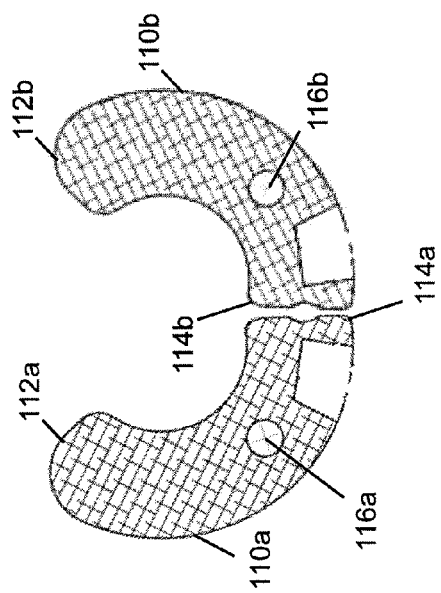
FIG. 2B depicts arms of the exemplary clamp in a second position corresponding to an open clamp state.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

The present invention provides a clamp for single-handed operation. The invention allows a person to place an object into the clamp with one hand. The clamp will transition from a closed clamp state to an open clamp state when an object is pressed against the outside of the clamp. The object will then continue into the clamp while the clamp is in its open clamp state. Once inside the clamp, the object will engage the back of the inside of the clamp thereby causing the clamp to transition from the open clamp state to a closed clamp state such that the clamp will maintain control of the object when the person releases the object. The same hand can then be used to lock the clamp in its closed clamp state. The invention also allows a person to remove a secured object from the clamp with one hand where the person uses the hand to unlock the clamp. After unlocking, the clamp maintains in its closed state and the person can then use the same hand to grasp the object and pull the object from the clamp to remove it.

FIGS. 1A-1F depict a first exemplary clamp 100 for single-handed operation and components of the first exemplary clamp 100. Referring to FIGS. 1A-1F, the clamp 100 includes a frame (or base) 102 having a first side 104a and a second side 104b. The frame can be made of metal, plastic, wood, or any other desirable material and may be solid or a mesh, may be clear or opaque, may be painted, etc. A space 106 is between the first side 104a and the second side 104b. The first side 104a has a first frame hole 108a and a second frame hole 108b. The second side 104b has a third frame hole 108c and a fourth frame hole 108d. The first frame hole 108a and the second frame hole 108b that line up with the third frame hole 108c and the fourth frame hole 108d, respectively. A first arm 110a having a first front end 112a, a first back end 114a, and a first arm hole 116a is placed into the space 106 and, as shown, a first attachment mechanism 118a is passed through the third frame hole 108c, through the first arm hole 116a, and through the first frame hole 108a enabling the first arm 110a to pivot relative to the frame 102 about the first attachment mechanism 118a and about a first axis. Similarly, a second arm 110b having a second front end 112b, a second back end 114b, and a first arm hole 116b is placed into the space 106 and a second attachment mechanism 118b is passed through the fourth frame hole 108d, through the second arm hole 116b, and through the second frame hole 108b enabling the second arm 110b to pivot relative to the frame 102 about the second attachment mechanism 118b and about a second axis. One skilled in the art will recognize that the first attachment mechanism could be passed through the first frame hole, through the first arm hole, and through the third frame hole to enable the same pivoting of the first arm and the second attachment mechanism could be passed through the second frame hole, through the second arm hole, and through the fourth frame hole to enable the same pivoting of the second arm. Like the frame, the two arms can be made of metal, plastic, rubber, wood, or any other desirable material. The arms may be solid or a mesh, may be clear or opaque, may be painted, etc.

As depicted, both the first attachment mechanism 118a and the second attachment mechanism 118b have threads that screw into respective screw lock helical inserts 120a 120b. Four additional screw lock helical inserts 120c-120f are inserted into four frame attachment holes (not shown) located in the bottom of the frame 102, which enable four additional threaded attachment mechanisms to be used to attach the clamp to another object, for example, a surface of a vehicle. One skilled in the art that various other types of attachment mechanisms could be used to enable the first arm and second arm to pivot about their respective axes. For example, a clevis pin and cotter pin could be employed.

A detent mechanism 122 (e.g., a detent pin) including a spring 124 and a pull mechanism 126 is shown external to the frame 102 in FIG. 1F and inserted into a detent hole (not shown) inside a detent guide 123 in FIG. 1E. When inserted into the detent guide 123, the detent mechanism 122 will fit into a space 127 between the two arms 110a 110b thereby preventing them from pivoting and locking the clamp in its closed clamp state.

In FIG. 1D an arm spring hole 128 and a corresponding frame spring hole (not shown) enable a compression spring 130 to be placed into a given arm 110 and the frame 102. As such, as depicted in FIG. 1E, each arm 110a 110b has associated with it at least one compression spring 130a 130b that is between the arm 110a 110b and the frame 102. One or more compression springs 130 can be located between the attachment mechanism 116 and the back end 114 of the arm 110 to produce an open clamp force(s) that causes the arm to pivot towards an open clamp position. Alternatively, one or more compression springs 130 can be located between the attachment mechanism 116 and the front end 112 of the arm 110 to produce a close clamp force(s) that causes the arm 110 to pivot towards a closed clamp position. Furthermore, one or more compression springs 130 can be located between the attachment mechanism 116 and the back end 114 of the arm 110 to produce open clamp force(s) and one or more compression springs 130 can be located between the attachment mechanism 116 and the front end 112 of the arm 110 to produce closed clamp force(s), where the open clamp force(s) and closed clamp force(s) oppose each other. Such opposing forces can enable a clamp to remain in the closed clamp state and to hold and maintain control of an object even though the detent mechanism 122 is in the open position (i.e., outside the space 127 between the two arms), whereby an object being held by the clamp can be pulled strongly enough so as to overcome the close clamp force(s) so that the clamp will achieve an open clamped state and the object can be removed from the clamp. One skilled in the art will recognize that the springs can be tailored such that desired open clamp forces and/or open clamp forces are produced. One skilled in the art will also recognize that the present invention can be practiced using multiple first arms, multiple second arms or with a combination of one first arm with multiple second arms or one second arm and multiple first arms. The clamp can also be practiced with one or more fixed first arms and one or more pivoting second arms, or one or more fixed second arms and one or more pivoting first arms. Moreover, the width of a given arm can be of any desired width, for example, several inches wide so as to clamp along several inches of an elongated cylinder such as a rifle barrel. Furthermore, two or more clamps can be configured to work together to hold an object.

Figure 2D:
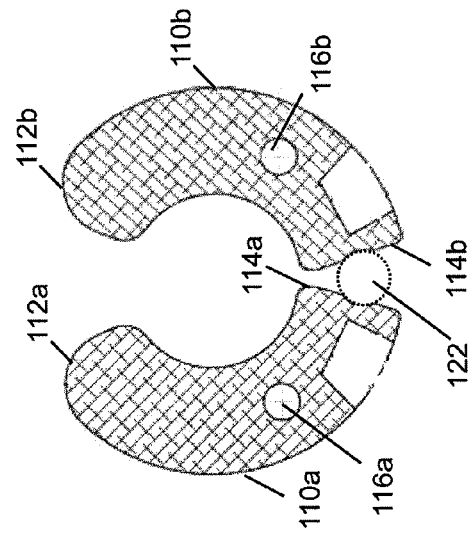
FIG. 2D depicts placement of an exemplary detent pin in between the back ends of the two arms thereby maintaining the closed clamp state.
Figure 2A:
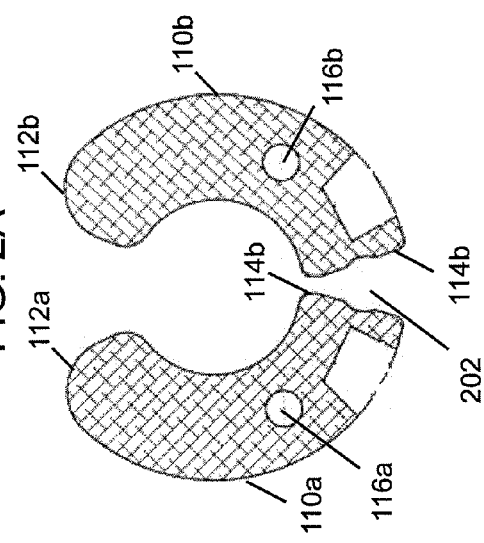
FIG. 2A depicts arms of the exemplary clamp in a first position corresponding to a closed clamp state.

FIG. 2A depicts arms of the exemplary clamp in a first position corresponding to a closed clamp state. Referring to FIG. 2A, a first arm 110a and a second arm 110b are able to pivot about holes 116a 116b and are in a closed position such that there is a space 127 between the two back ends 114a 114b of the two arms. There is also a second space between the two front ends 112a 112b of the two arms 110a 110b that is sufficiently wide so as to partially receive an object. This second spacing enables the object to be placed against the two front ends of the two arms causing them to pivot such that the second space grows larger until the object causes the arms to fully open such that the clamp is in an open clamp position corresponding to an open clamp state. As depicted in FIG. 2A, lines extend from the two arms as if originating at their respective pivot points corresponding to their arm holes 116a 116b and crossing to the opposing arm such that they cross at a first location 202a that is generally in the center of the opening between the two arms.

FIG. 2B depicts arms of the exemplary clamp in a second position corresponding to an open clamp state. Referring to FIG. 2B, the two arms 110a 110b are shown such that the space 127 between the two back ends 114a 114b is substantially gone and the second space between the two front ends 112a 112b is fully opened. When fully opened, the two lines of FIG. 2A now cross at a location 202b midway between the two front ends of the two arms but generally near the two front ends of the two arms. When the object has passed through the second space between the two front ends and encounters the two back ends 114a 114b, it causes the two arms to pivot to their closed positions corresponding to the closed clamp position depicted in FIG. 2A.

Figure 2C:
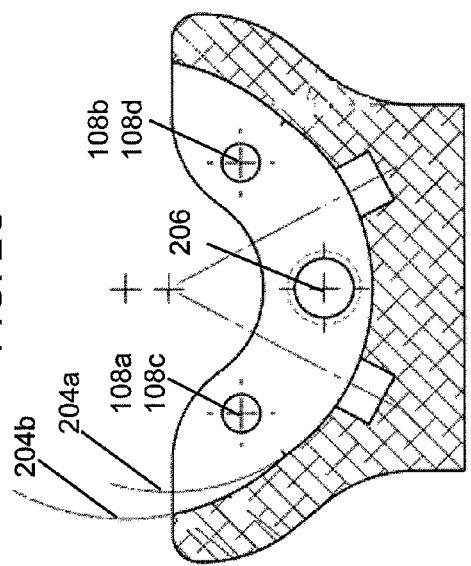
FIG. 2C depict exemplary arcs of the open and closed positions of the left arm within the frame of the exemplary clamp.
Figure 3A:
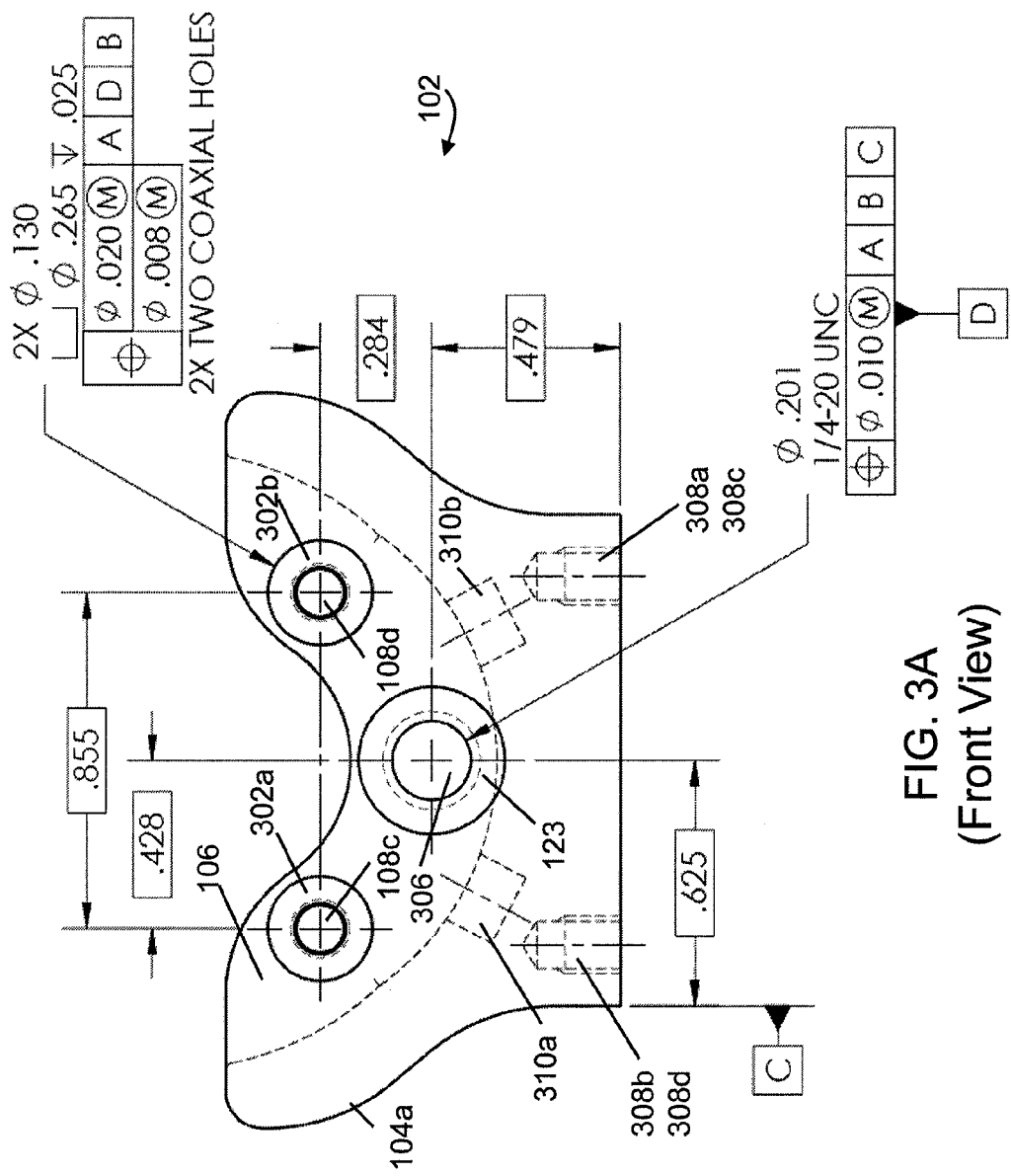
Figure 3C:
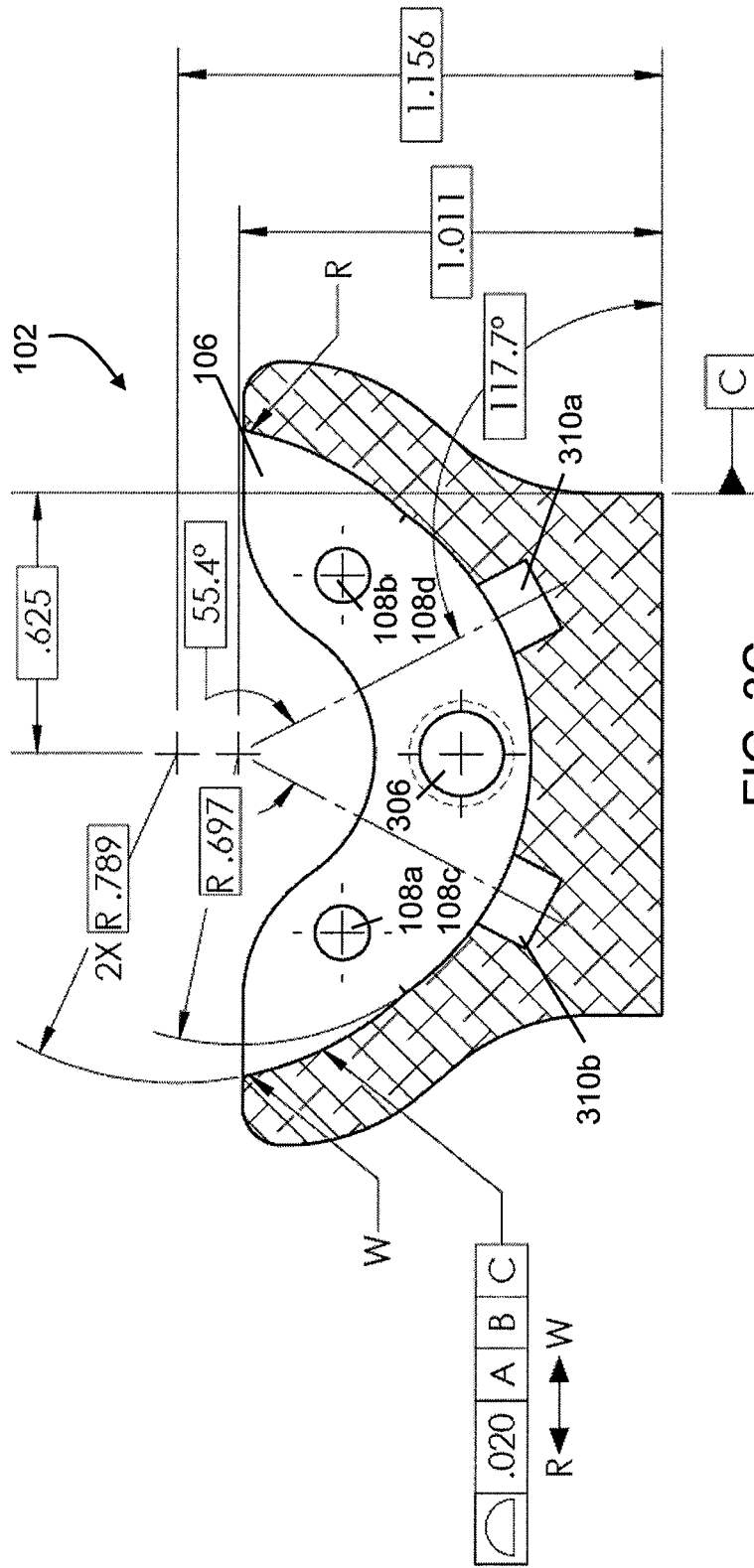
Figure 3E:
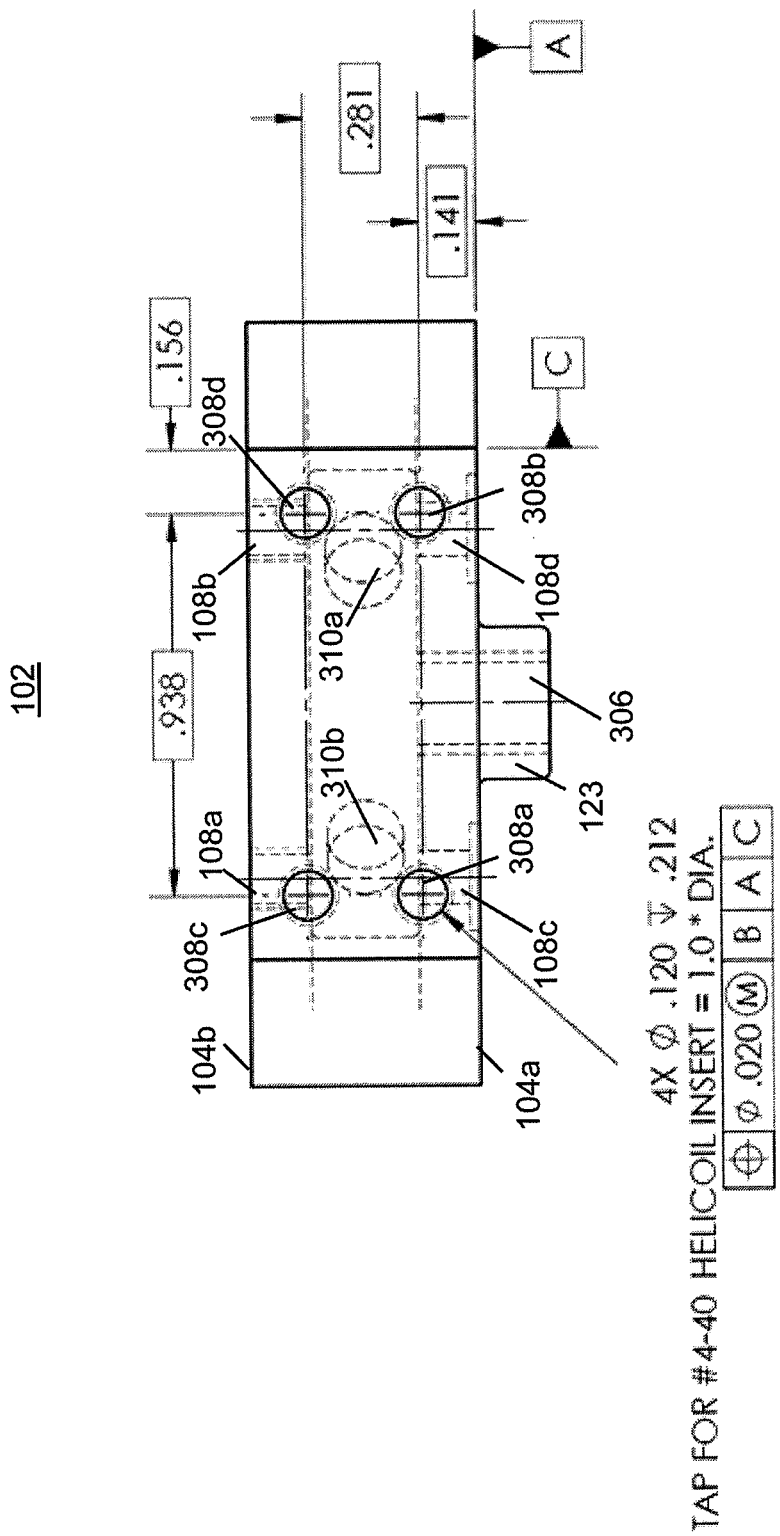
Figure 3F:
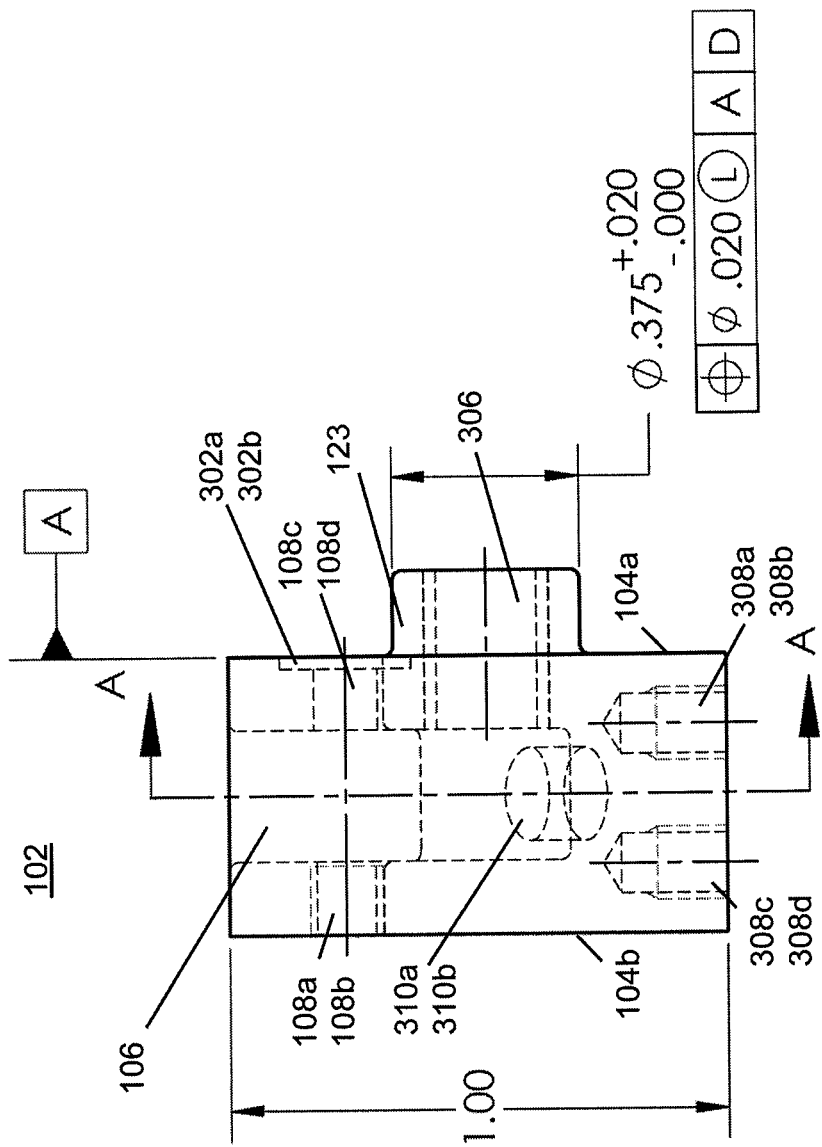
Figure 6A:
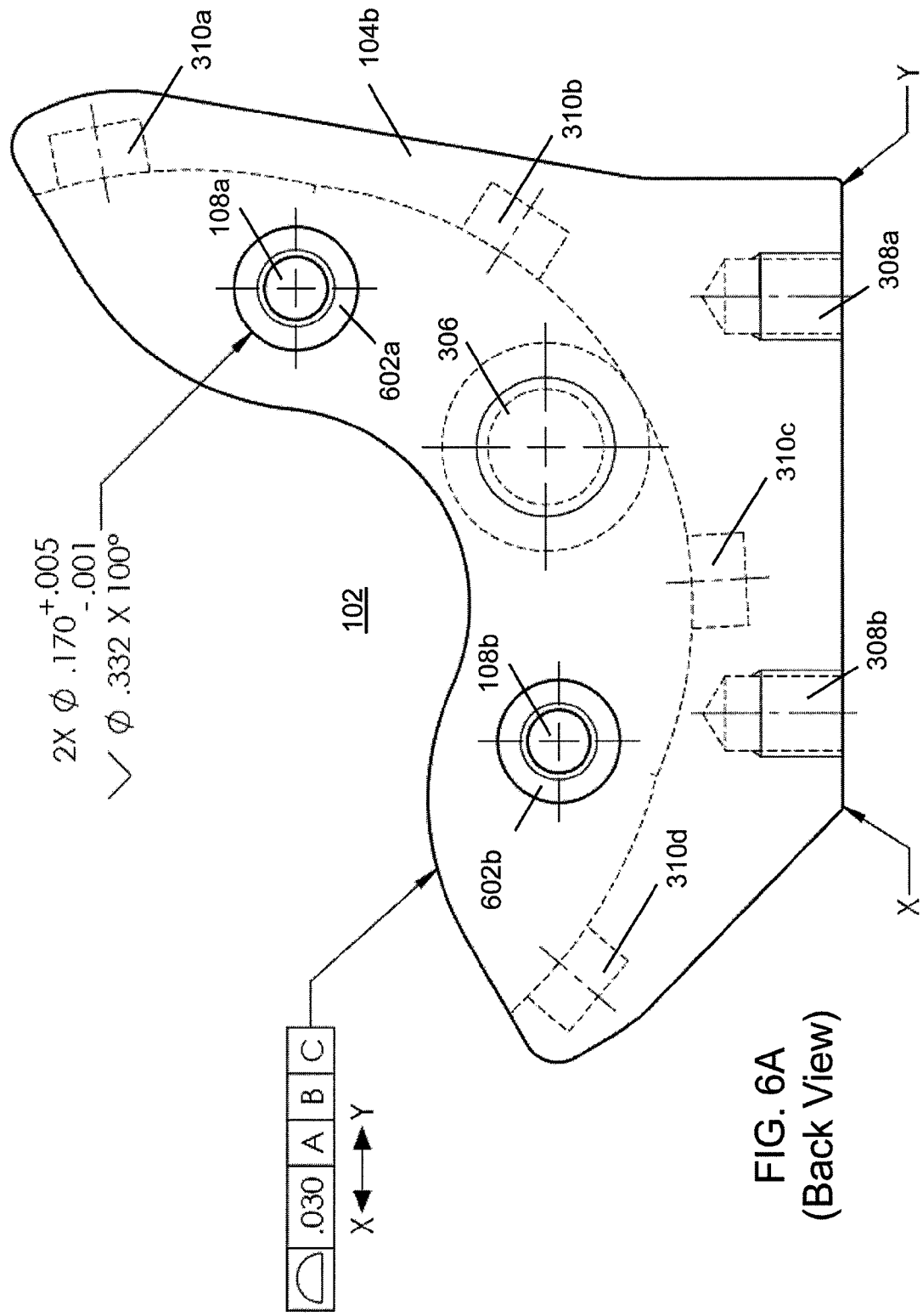
Figure 6C:
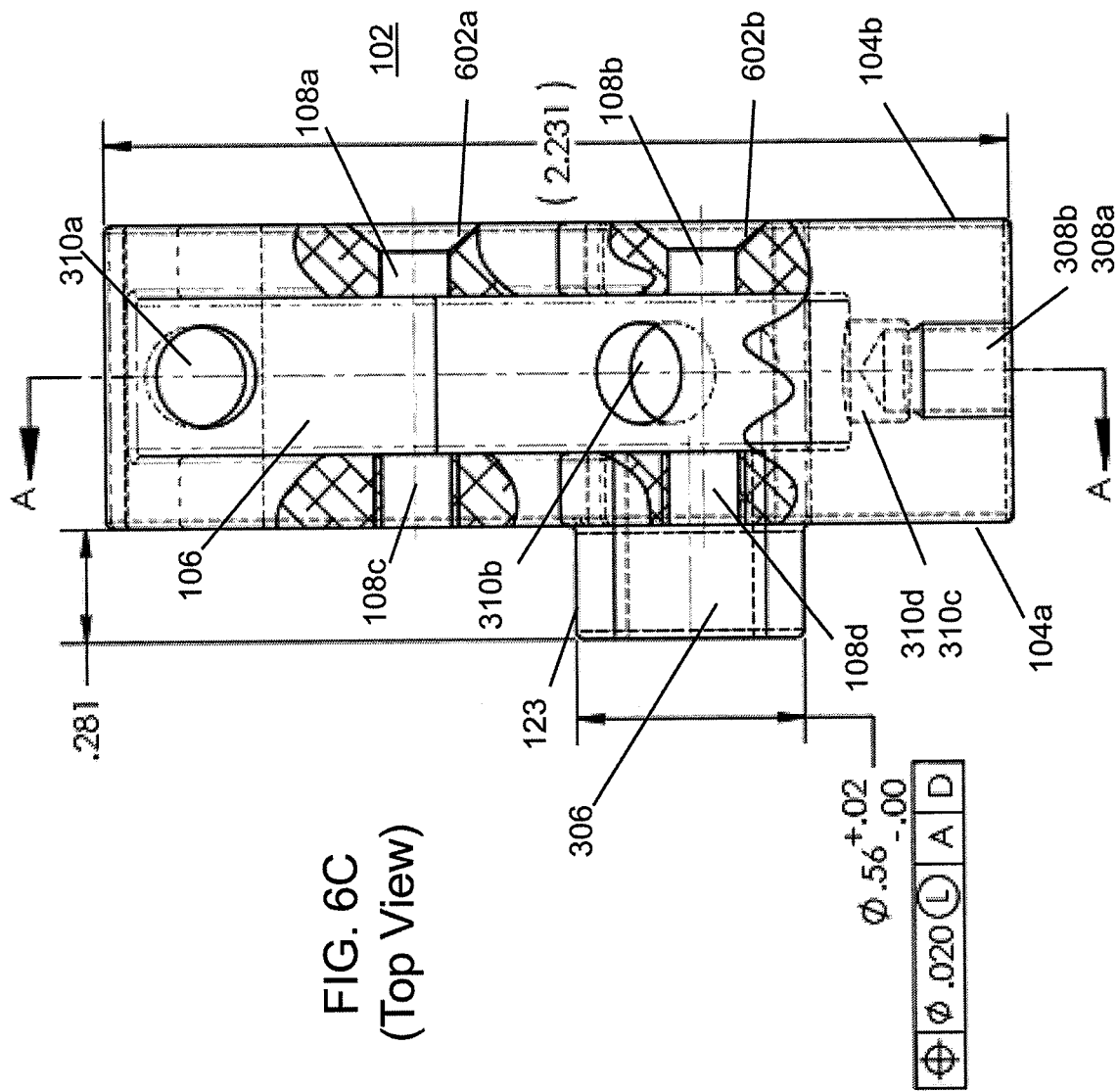
Figure 7A:
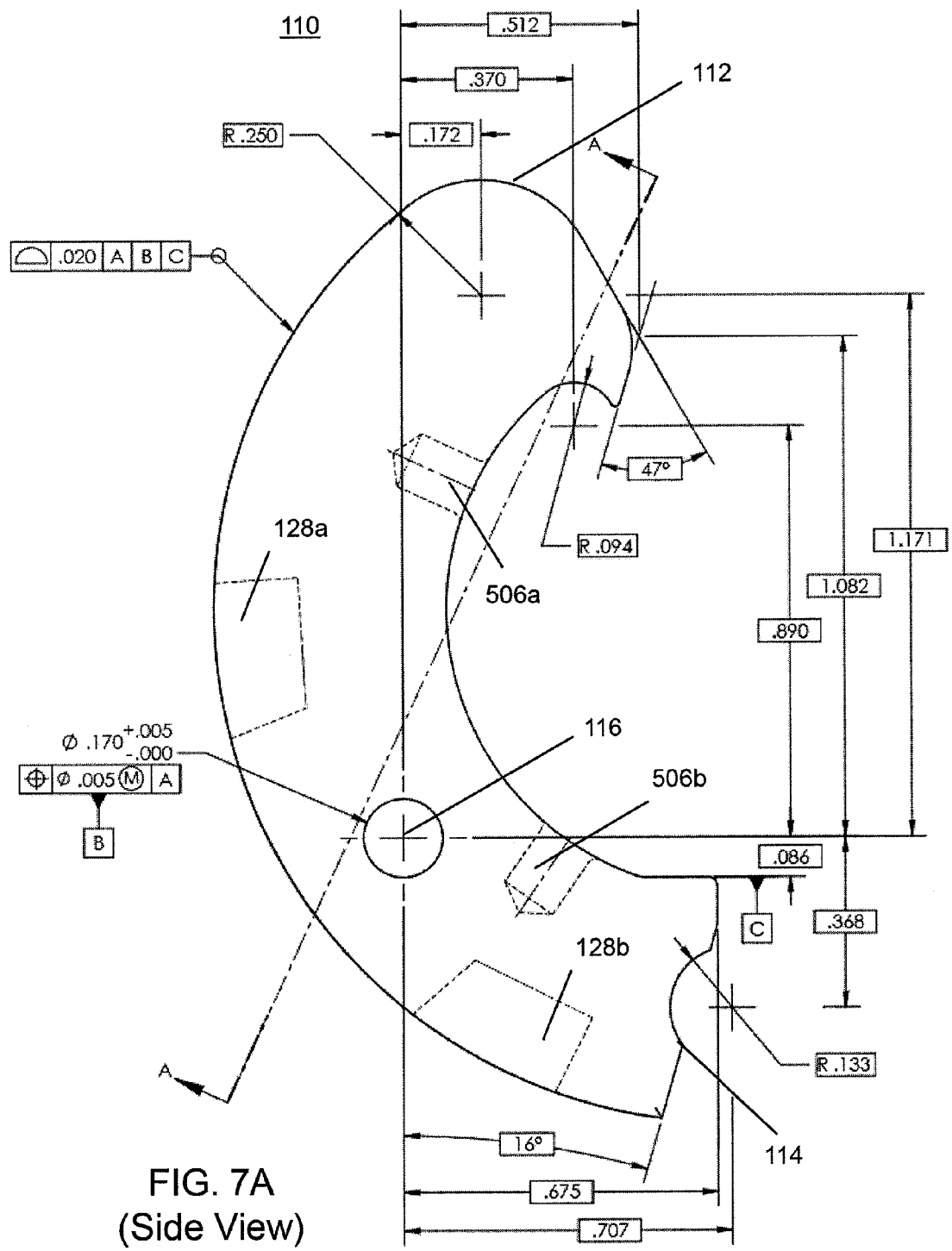
FIGS. 7A-7D depict exemplary engineering drawings of the arm of the clamp of FIGS. 5A-5G.
Figure 7B:
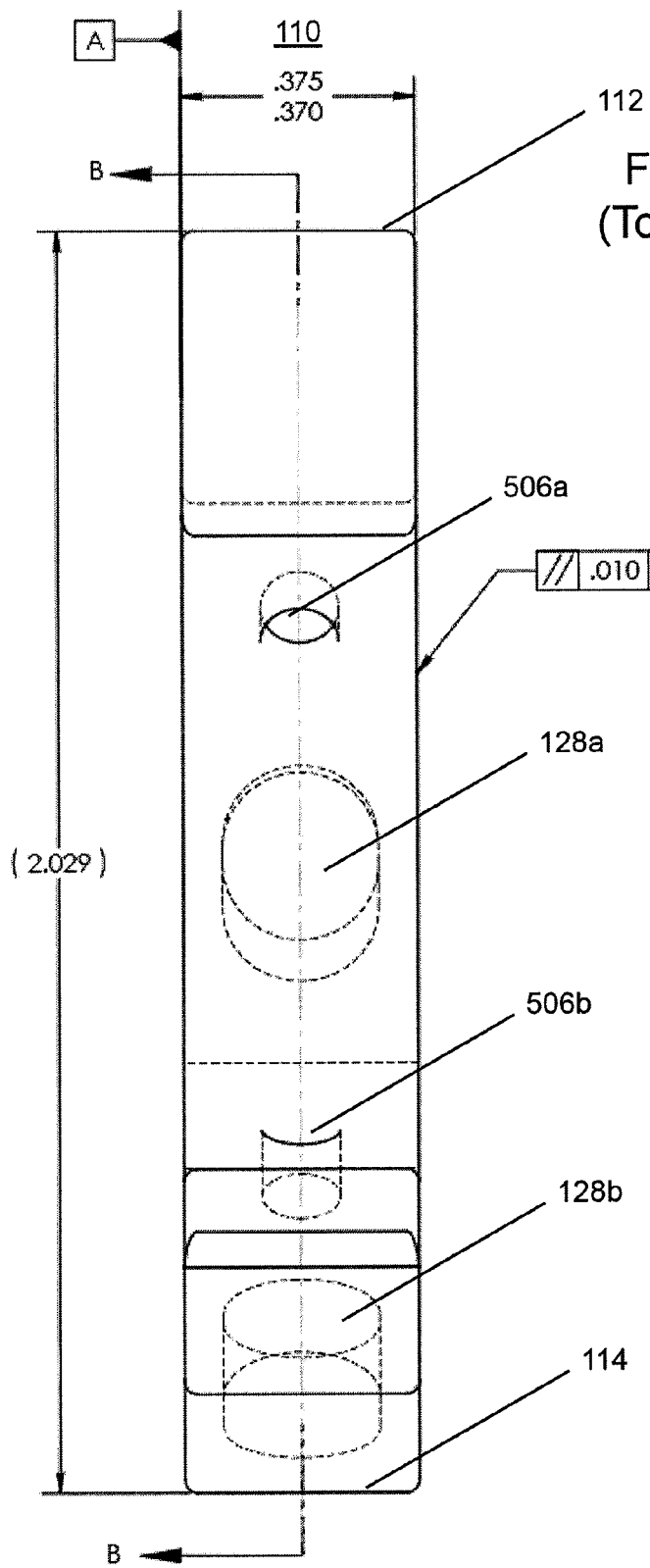
Figure 7C:
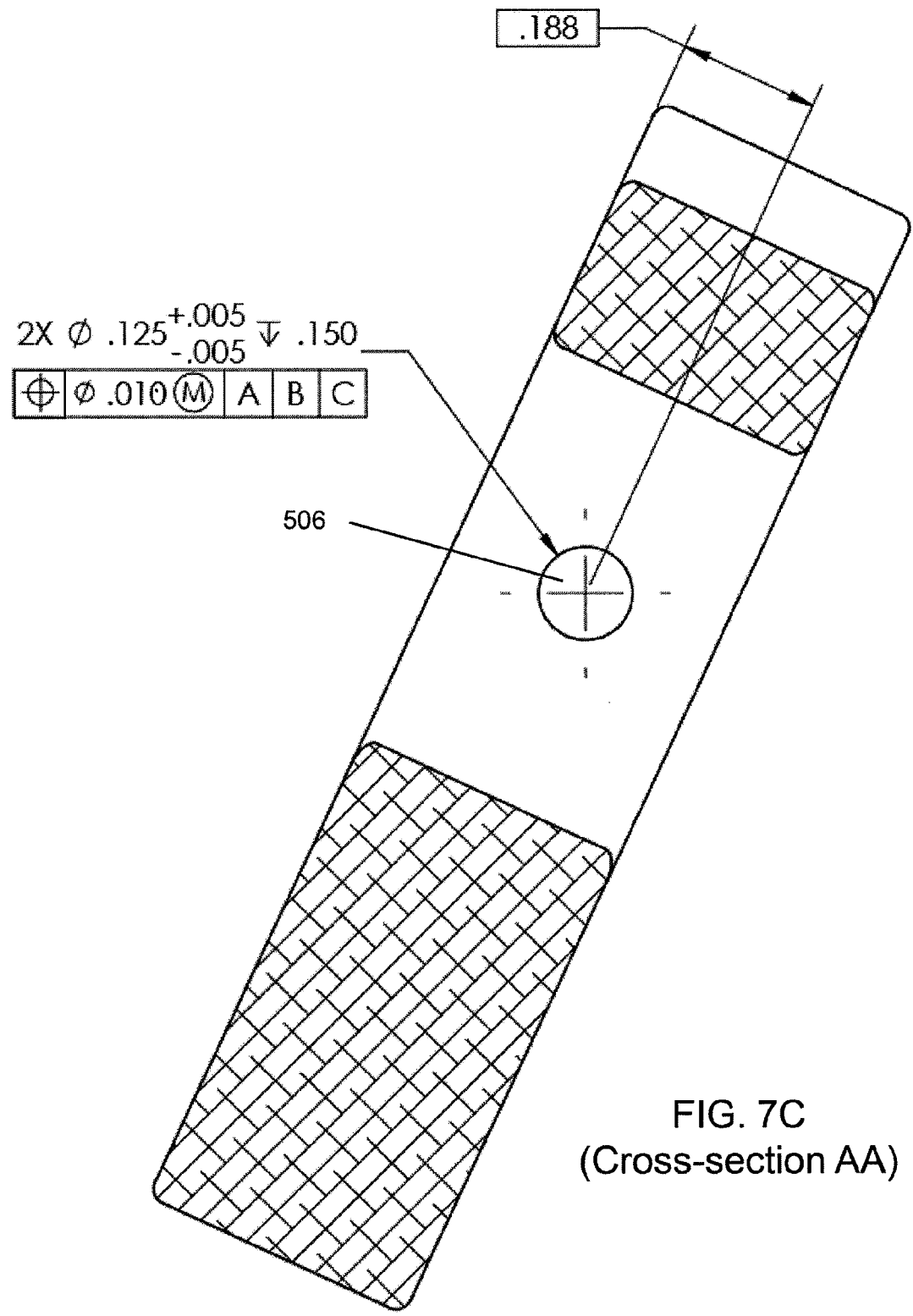
Figure 7D:
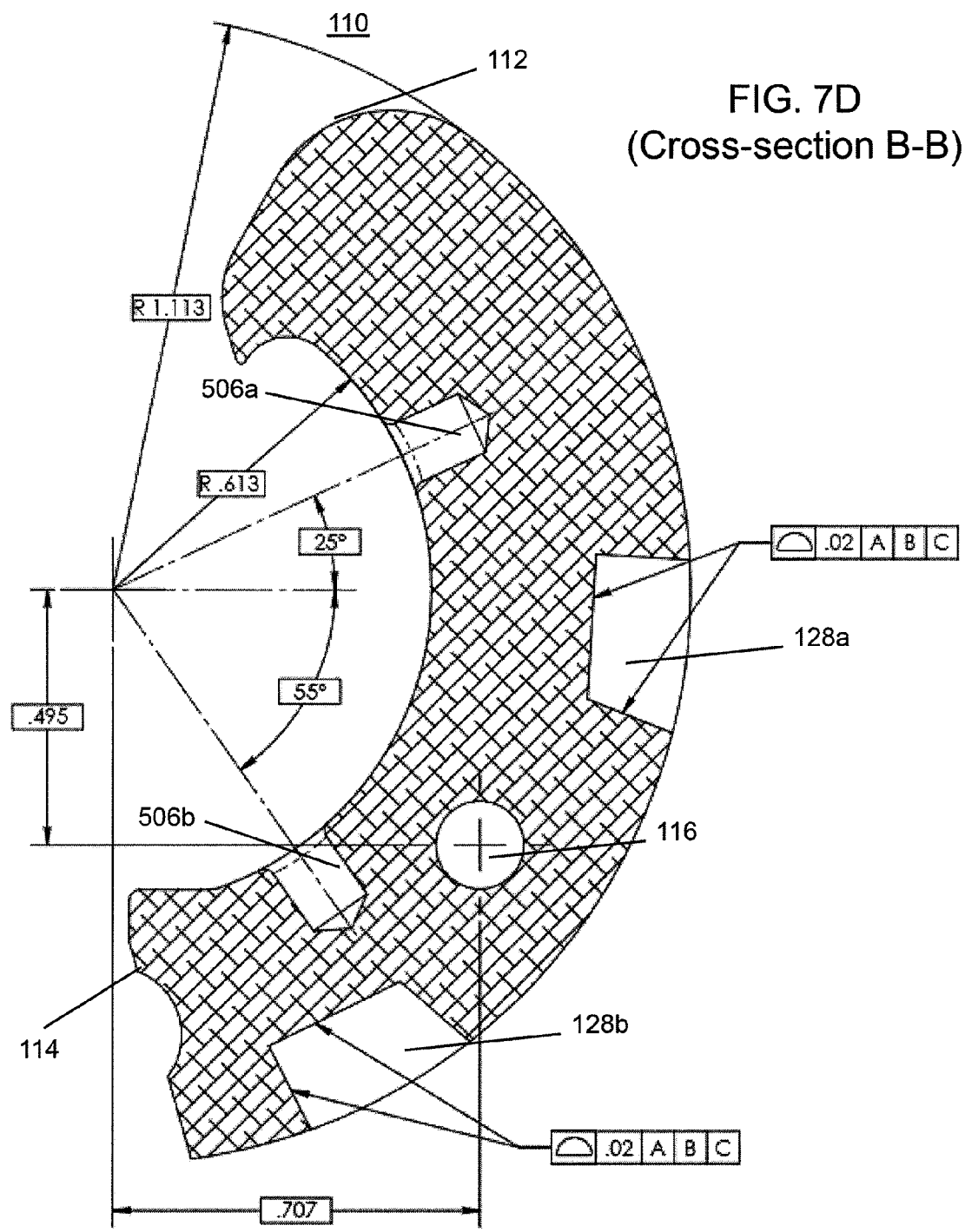

FIG. 2C depicts exemplary arcs of the open and closed positions of the left arm within the frame of the exemplary clamp. Referring to FIG. 2C, a cross-section of the frame 102 is shown having a first frame hole 108a 108c and a second frame hole 108b 180d and a detent hole 206. When the first arm 110a is placed into the frame 102, the first arm hole 116a of the first arm 110a aligns with the first clamp holes 108a 108c of the two sides of the frame, and the second arm hole 116b of the second arm 110b aligns with the second clamp hole 180b 108d of the two sides of the frame. When the first arm 110a is in a closed position corresponding to a closed clamp state, the back of the arm lies along a first arc 204a about the first location 202a. When the first arm 110b is in an open position corresponding to an open clam state, the back of the arm 110b lies along a second arc 204b about the second location 202b.

FIG. 2D depicts placement of an exemplary detent pin in space 122 between the back ends of the two arms thereby maintaining the closed clamp state. As shown in FIG. 2D, the detent mechanism 122 prevents the back end 114a of the first arm 110a from moving any closer to the back end 114b of the second arm 110b thus preventing the second spacing between the front ends 112a 112b from opening regardless of whether an object is pushed against either of the two front ends 112a 112b.

FIGS. 3A-3G depict exemplary engineering drawings of the frame of the clamp of FIGS. 1A-1F. Referring to FIGS. 3A-3G, various views of the frame 102 of the clamp 100 are provided and show features of the frame 102 not previously described in relation to FIGS. 1A-1F. Such features include optional recessed circular regions 302a 302b about the third and fourth frame holes 108c 108d, respectively, which receive a portion of the first and second attachment mechanisms 118a 118b, respectively. Also shown are the four frame attachment holes 308a-308d that receive the four additional screw lock helical inserts 120c-120f previously depicted in FIG. 1F, where the screw lock helical inserts interact with the outside threads of the two attachment mechanisms. Additionally, two frame spring holes 310a 310b are depicted which receive portions of the two compression springs 130a 130b previously shown in FIG. 1E.

FIGS. 4A-4C depict exemplary engineering drawings of the arm of the clamp of FIGS. 1A-1F.

FIGS. 5A-5G depict a second exemplary clamp 500 for single-handed operation and components of the second exemplary clamp 500 in accordance with the invention. The second exemplary clamp 500 is similar to the first exemplary clamp 100 described in relation to FIGS. 1A-1F but has a few variations that one skilled in the art will recognize are the result of design choices. For example, the second exemplary clamp has springs 130a-130d on both sides of the arm holes 116a 116b that are recessed into four corresponding spring holes 310a-310d. The clamp also has different attachment mechanisms 118a 118b and has only two clamp attachment holes 308a 308b having two corresponding screw lock helical inserts 120c 120d. Additionally, the shape of the frame is designed such that the clamp will receive an object at a non-perpendicular angle relative to the surface to which the frame of the clamp is attached.

The exemplary clamp 500 includes two elastic mechanisms 502 intended to protect an object being held by the clamp from wear and tear and to reduce vibration effects resulting from movement of the object to which the clamp is attached (e.g., a military vehicle moving across rough terrain). Under one arrangement, each elastic mechanism 502a 502b comprises an elastomer, for example rubber. Such elastomers may include thermosets and may be thermoplastic. As shown, each elastic mechanism 502a 502b includes two studs 504a 504b that are received by two elastic mechanism attachment holes 506a 506b, respectively, that are located in recessed areas of the two arms 110a 110b. An elastic mechanism 502a may be formed to conform to a predefined object shape (e.g., a cylindrical shape) as part of a manufacturing process or may be formed by a user of the clamp mixing a moldable elastomer, for example a two-part silicone elastomer such as DMR-503 Replication Putty by Dynamold, Inc., to conform to the shape of an object the user desires the clamp to hold. For example, the handle of a tool a user wants to be held by the clamp might be hexagonally shaped. The user of the clamp would mix the two-parts of the silicone elastomer, place the tool into the clamp, and allow the elastomer to set after which the elastic mechanism 502 would provide a custom fit for holding the tool. One skilled in the art will recognize that any of various elastomer molding techniques can be employed to enable a user of the clamp to mold an elastic mechanism 502 to fit an object's shape.

FIGS. 6A-6G depict exemplary engineering drawings of the frame of the clamp of FIGS. 5A-5G. Referring to FIGS. 6A-6G, various views of the frame 102 of the clamp 500 are provided and show one additional difference of the frame 102 not previously described in relation to FIGS. 5A-5G. Specifically, the optional recessed circular regions 302a 302b on the first side 104a of the frame 102 depicted in FIGS. 3A-3G are no longer present. Instead, optional beveled recessed circular regions 602a 60b are shown on the second side 104b of the frame 102 about the two frame holes 108a 108b. As depicted, the two attachment mechanisms 118a 118b pass through the first side 104b of the frame 102, through the respective arms 110a 110b, and through the second side 104a of the frame 102, where the two screw lock helical inserts 120a 120d are placed into two frame holes 108c 108d on the first side 104b of the frame 102 such that they will interact with the inside threads of the two attachment mechanisms 118a 118b.

FIGS. 7A-7D depict exemplary engineering drawings of the arm 110 of the clamp 500 of FIGS. 5A-5G.

Figure 8A:
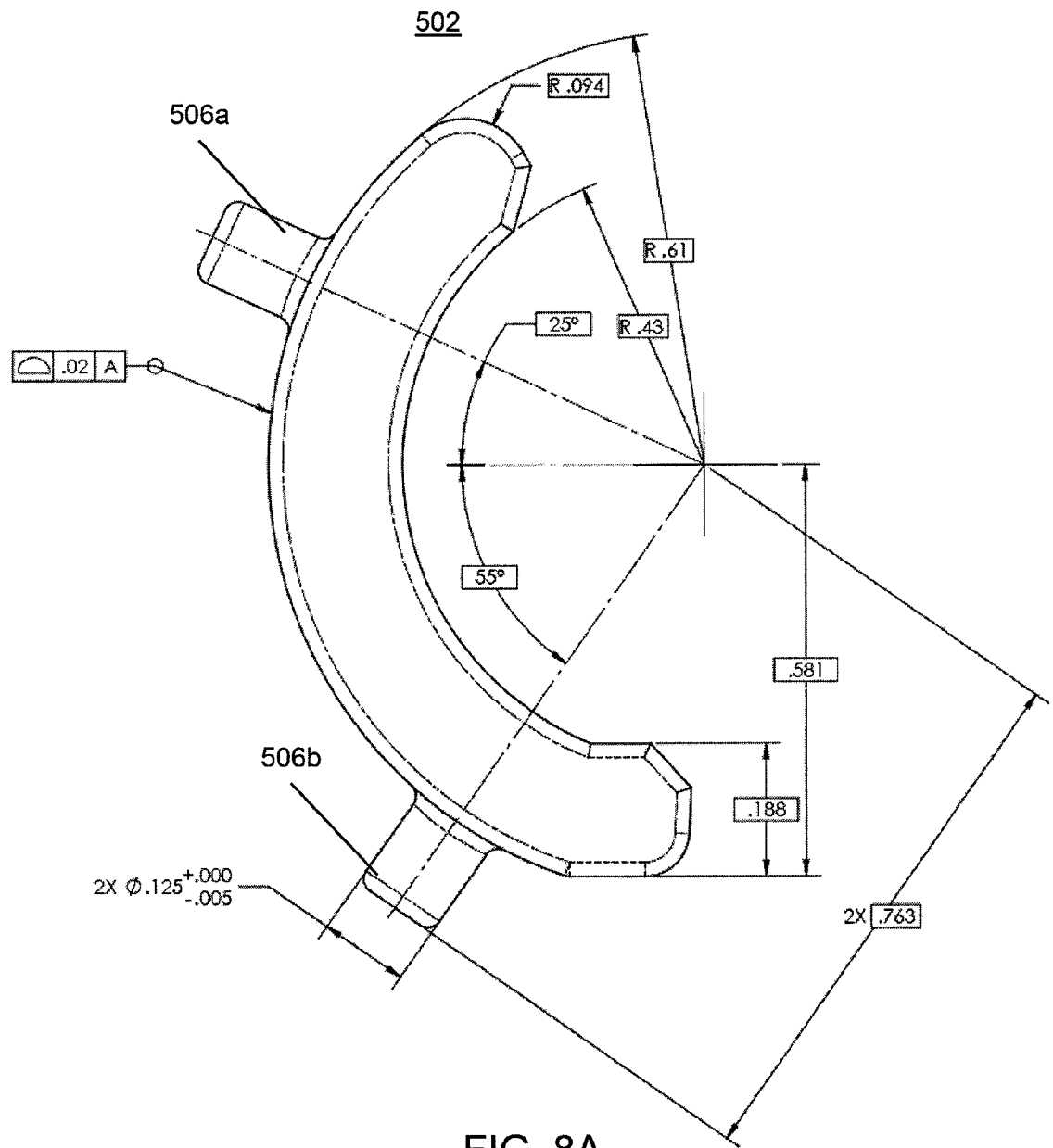
FIGS. 8A and 8B depict exemplary engineering drawings of the elastic mechanism of FIGS. 5A-5G.
Figure 8B:
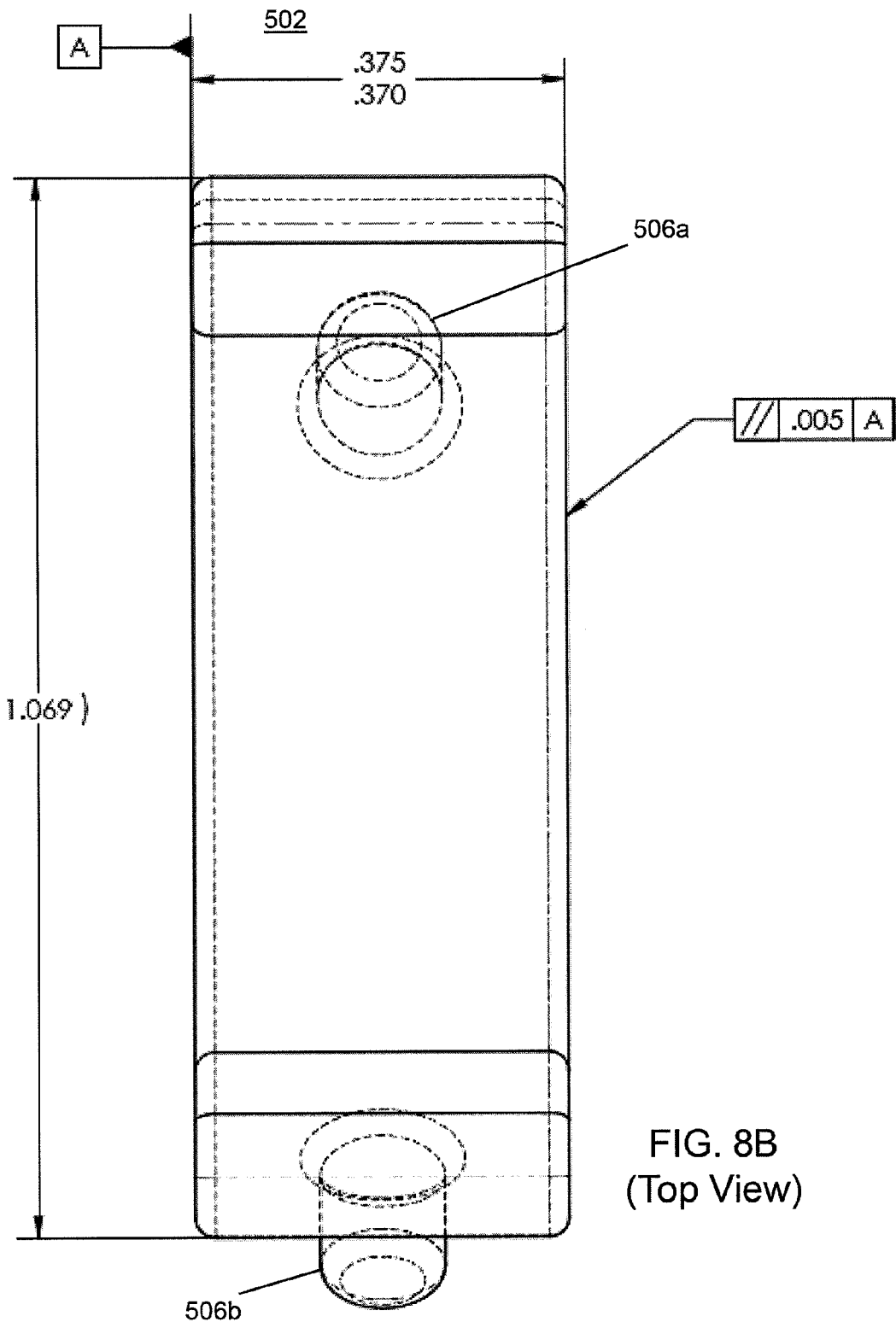

FIGS. 8A and 8B depict exemplary engineering drawings of the elastic mechanism 502 of the clamp of FIGS. 5A-5G.

Figure 9A:
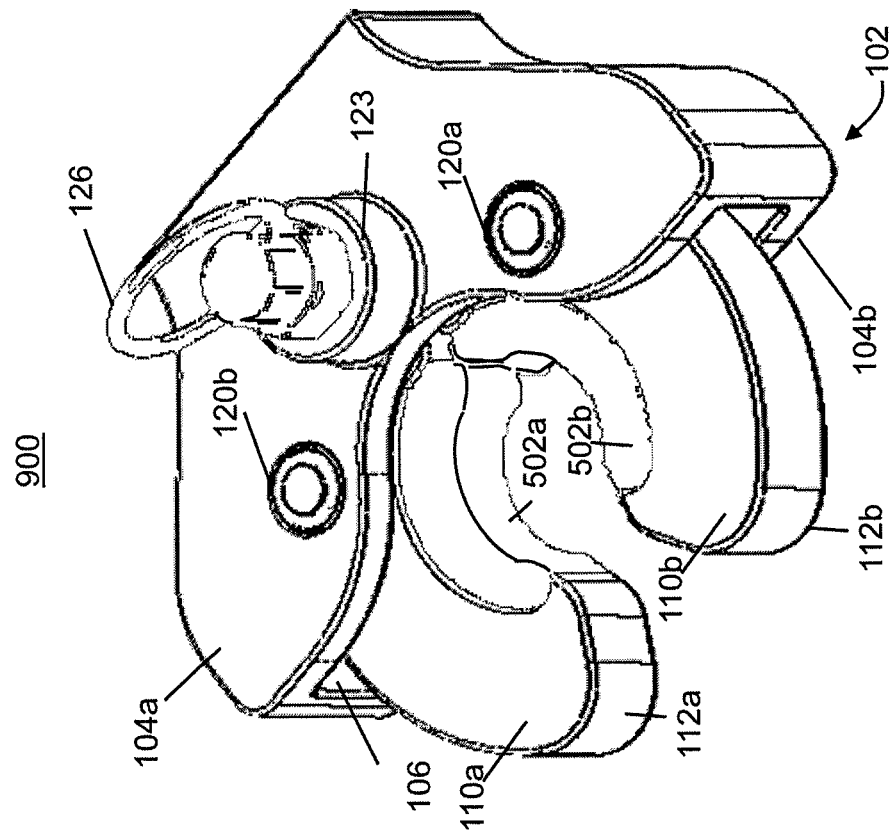
FIGS. 9A and 9B depict a third exemplary clamp for single-handed operation in accordance with the invention.
Figure 9B:
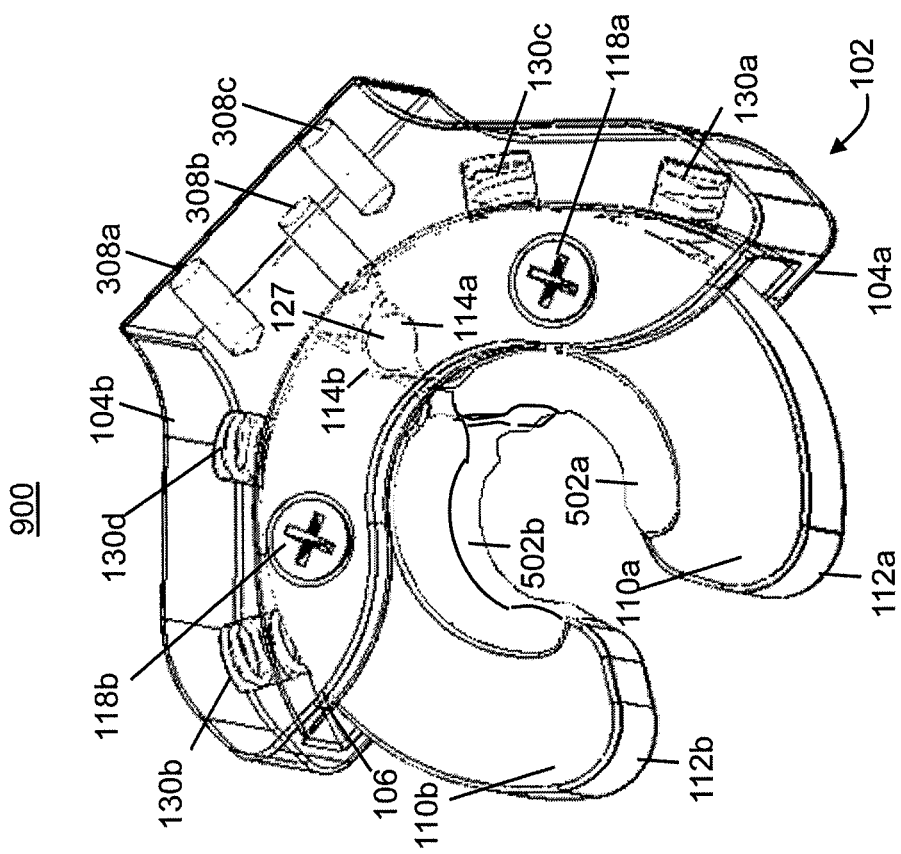

FIGS. 9A and 9B depict a third exemplary clamp 900 for single-handed operation in accordance with the invention. The third exemplary clamp 900 has features of both the first exemplary clamp 100 and the second exemplary clamp 500. The third exemplary clamp 900 has a frame like that of the first exemplary clamp 100 but has attachment mechanisms, four compression springs, and elastic mechanisms like that of the second exemplary clamp 500. The third exemplary clamp 900 also has three frame attachment holes 308a-308c.

Figure 10C:
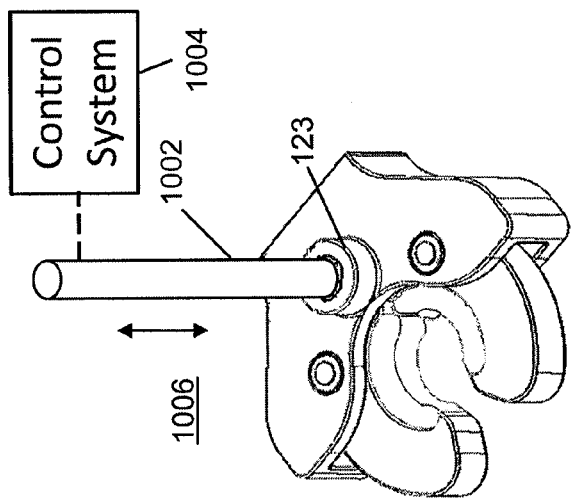
FIGS. 10B and 10C depict an exemplary clamp having a control system and rod having a detent pin in the unlocked and locked positions.
Figure 10B:
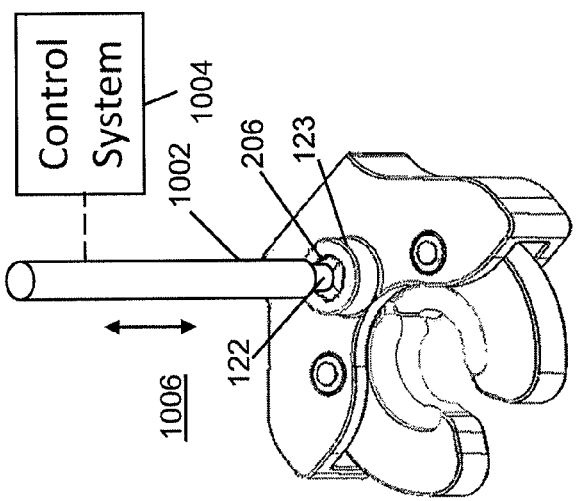
Figure 10A:
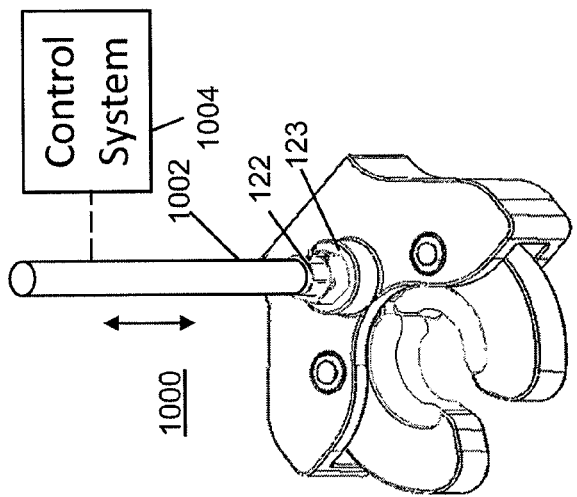
FIG. 10A depicts an exemplary clamp having a control system and rod used to engage and disengage a spring detent mechanism.

FIG. 10A depicts an exemplary clamp 1000 having a control system 1004 and rod 1002 used to engage and disengage a spring detent mechanism 122 within the detent guide 123 so as to lock and unlock the clamp 1000. FIGS. 10B and 10C depict another exemplary clamp 1006 also having a control system 1004 and rod 1002 having a detent pin 122 used to engage and disengage a spring detent mechanism 122 within the detent guide 123, where FIG. 10B depicts the rod 1002 in an unlocked position and FIG. 10C depicts the rod 1002 in a locked position. A control system can be used to automatically control one or more such clamps so as to control whether associated objects within them are releasable or not. For example, a series of such clamps controlled by a control system might be used to maintain control over rifles in an armory, whereby an automated control would lock the clamps to secure the rifles or unlock the clamps enabling soldiers to remove the rifles from the clamps. Similarly, a control system might lock and unlock clamps holding bars of prison or zoo cells; lock and unlock clamps holding pallets having cargo on a ship, plane, or train; lock and unlock clamps holding missiles or other munitions to be fired by a weapon system; lock and unlock clamps holding objects as part of a manufacturing or assembly process; etc. Generally, an automated control system can be used with clamps in accordance with the invention to control when objects can be inserted into or removed from such clamps.

Figure 10E:
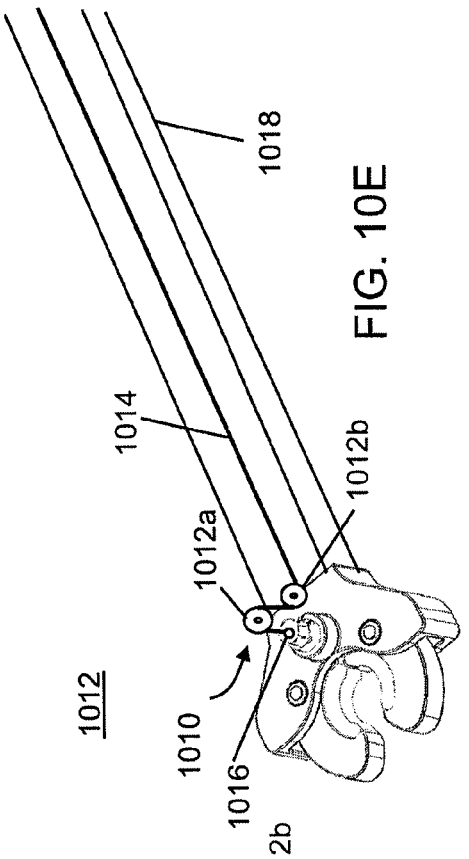
FIG. 10E depicts another exemplary pulley system used to change the direction and location from which a pull mechanism is pulled.
Figure 10D:
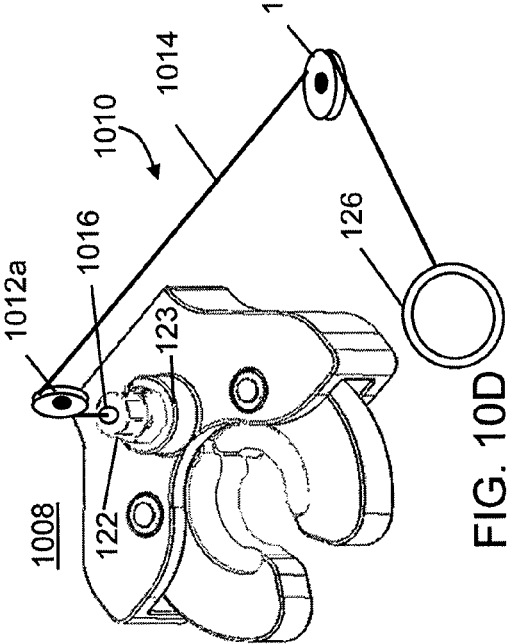
FIG. 10D depicts an exemplary clamp having a pulley system used to change the direction and location from which a pull mechanism is pulled relative to the detent mechanism.

FIG. 10D depicts an exemplary clamp 1008 having a pulley system used to change the direction and location from which a pull mechanism is pulled relative to the detent mechanism. Referring to FIG. 10D, the exemplary clamp 1008 includes a pulley system 1010 comprising a first pulley 1012a and a second pulley 1012b. A wire (or rope, cable, belt, or chain) 1014 passes through the two pulleys 1012a 1012b and is attached at one end to a pull mechanism 126 and is attached at the other end to a pulley wire attachment device 1016 that is attached to the detent mechanism residing within the detent guide. One skilled in the art will recognize that pulleys in addition to or instead of changing the direction of pulling by a user, pulleys can be used to reduce the amount of pull force a user must apply to manipulate the detent mechanism. As depicted, a user pulling the pull mechanism 126 away from the front ends of the arms of the clamp 1008 causes the detent mechanism 122 to be lifted upward.

FIG. 10E depicts another exemplary pulley system used to change the direction and location from which a pull mechanism is pulled. As depicted, the wire 1014 is connected to the pulley wire attachment mechanism 1016 and passes through a first pulley 1012a and a second pulley 1012b and up an extension device 1018, which could be part of a robotic assembly, a hand held extension device, or any other extension device enabling control of the location and locked or unlocked state of the clamp.

FIGS. 11A and 11B depict a second exemplary elastic mechanism 1102 formed to hold on to a square object. Referring to FIGS. 11A and 11B, the second exemplary elastic mechanism 1102 resembles the elastic mechanism 502 previously described except it is formed to receive a square shaped object instead of a round object.

FIG. 11C depicts yet another exemplary elastic mechanism 1104 that can be activated and formed to fit around an object. Referring to FIG. 11C, the elastic mechanism 1104 includes a first compartment 1106a and a second compartment 1106b. The first and second compartments 1106a 1106b contain two respective parts of a two-part formable elastomer such as previously described. A user of the elastic mechanism can break the divider 1108 between the first and second compartments 1106a 1106b in each of two such elastic mechanisms 1104 as installed in a clamp thereby allowing the two respective parts of the two-part formable elastomer to mix in both elastic mechanisms. After each of the two elastic mechanisms has achieved its formable state, an object can be placed into the clamp and the clamp closed until the two elastic mechanisms solidify to achieve their custom shape that conform to the shape of the object placed in the clamp.

FIGS. 12A-12G depict an exemplary square shaped object being moved into two arms designed to hold onto square objects in accordance with the present invention. Referring to FIGS. 12A-12G, the square object 1202 is placed against the two front ends 112a 112b of the two arms 110a 110b of the clamp when it is in a closed clamp state (where the clamp frame is not shown). As force is applied to the square object 1202, the two arms 110a 110b will pivot about respective pivot points corresponding to the arm holes 108a 108b used to attach them to the frame of the clamp. As such, as the object is moved into the clamp, the two arms pivot causing the spacing between the front ends 112a 112b of the two arms to open wider and the spacing between the back ends 114a 114b of the two arms to close so as to achieve an opened clamp state. After the square object 1202 has passed through the front ends 112a 112b of the two arms it encounters the back ends 114a 114b of the two arms causing the arms to again pivot about the arm holes 108a 108b thus causing the two arms to close about the square object and achieve a closed clamp state. One skilled in the art will recognize that different shaped arms can also be used to produce clamps intended to control objects having corresponding shapes.

FIG. 13A depict use of three quarter moon-shaped detent mechanism 1302 to keep the arms of FIGS. 12A-12G in their closed state. One skilled in the art will recognize that many different shapes can be used for detent mechanisms to maintain a closed clamp state for a given clamp having arms of a given shape.

FIG. 13B depicts use of set screws 1304 that can be used to control spring forces. One skilled in the art will understand that such set screws 1304 can be turned with a screwdriver or other tools so as to tighten or loosen them thereby increasing or decreasing the force produced by corresponding compression springs.

FIGS. 14A-14G depict the exemplary clamp 900 of FIGS. 9A and 9B being used to secure various objects in accordance with the present invention. FIG. 14A shows the clamp 900 being used to secure a cylindrical object 1402, for example, a pipe. FIGS. 14B and 14C depict two views of a fire extinguisher 1404 being held by the clamp 900. FIG. 14D depicts a handgun 1406 held by the clamp 900. FIG. 14E depicts a diver's oxygen tank 1408 being secured by a clamp 900 having wide arms 1410. FIG. 14F depicts a rifle barrel being held by a first clamp 900a and the stock of the gun being held by a second clamp 900b. FIG. 14G depicts a tool (e.g., a shovel) 1414 being held by a clamp 900.

FIG. 15A-15C depict exemplary use of multiple clamps to hold a cylindrical object and other similar objects that might be held using multiple clamps. Referring to FIG. 15A, a first clamp 900a and a second clamp 900b are oriented to work together to hold a cylindrical object, for example, a pipe. FIG. 15B depicts an exemplary log 1502 that might be held by multiple clamps 900a 900b and FIG. 15C depicts an exemplary missile 1504 that might be held by multiple clamps 900a 900b.

FIGS. 16A-16C depict exemplary scenarios where clamps in accordance with the present invention might be used to secure objects. Referring to FIG. 16A, clamps in accordance with the present invention can be used to produce a frame 1608, for example a tent frame. Referring to FIG. 16B, such clamps can be used to secure sports equipment 1610, for example a basketball goal, to a pole 1612. Referring to FIG. 16C, such clamps can be used to secure equipment 1614, for example an electrical transformer, to a utility pole 1616. Generally, one skilled in the art will recognize that the clamp for one handed operation of the present invention lends itself for many different applications where it is desirable that a clamp maintain control of an object while it is in the clamp, the clamp can be locked or unlocked with one hand, and object can be inserted into or removed from the clamp using one hand.

While particular embodiments of the invention have been described, it will be understood, however, that the invention is not limited thereto, since modifications may be made by those skilled in the art, particularly in light of the foregoing teachings.

The invention claimed is:

1. A clamp for holding an object, comprising:
a frame, said frame having a first side and a second side opposite said first side, said first side having a first frame hole, said second side having a second frame hole;
a first arm having a first front end, a first back end, and a first arm hole between said first front end and said first back end, said first arm being attached to said frame by a first attachment mechanism passing through said first frame hole, said first arm hole, and said second frame hole, said first arm pivoting relative to said frame about said first attachment mechanism and a first axis; and
a second arm having a second front end and a second back end, said pivoting of said first arm relative to said frame enabling said first front end and said second front end to have a first spacing apart corresponding to a closed clamp state and a second spacing apart corresponding to an open clamp state, wherein pressing an object against an outside portion of said first front end results in said first arm pivoting to a first position corresponding to said open clamp state enabling said clamp to receive said object until said object presses against said first back end that results in said first arm pivoting to a second position corresponding to said closed clamp state; and
at least one of a first compression spring mounted between said frame and said first arm at a location between said first axis and said first front end or a second compression spring mounted between said frame and said first arm at a location between said first axis and said first back end.

2. The clamp of claim 1, wherein pressing said object against an inside portion of said first front end results in said first arm pivoting to said first position corresponding to said open clamp state enabling said object to be removed from said clamp.

3. The clamp of claim 1, wherein a force holding said object can be adjusted by controlling at least one of a first stiffness of said first compression spring or a second stiffness of said second compression spring.

* * * * *